A. B. KLAY.
MACHINE FOR PRESSING AND SHAPING PLASTIC WARE.
APPLICATION FILED JULY 7, 1916.
1,295,760.
Patented Feb. 25, 1919.
9 SHEETS—SHEET 3.
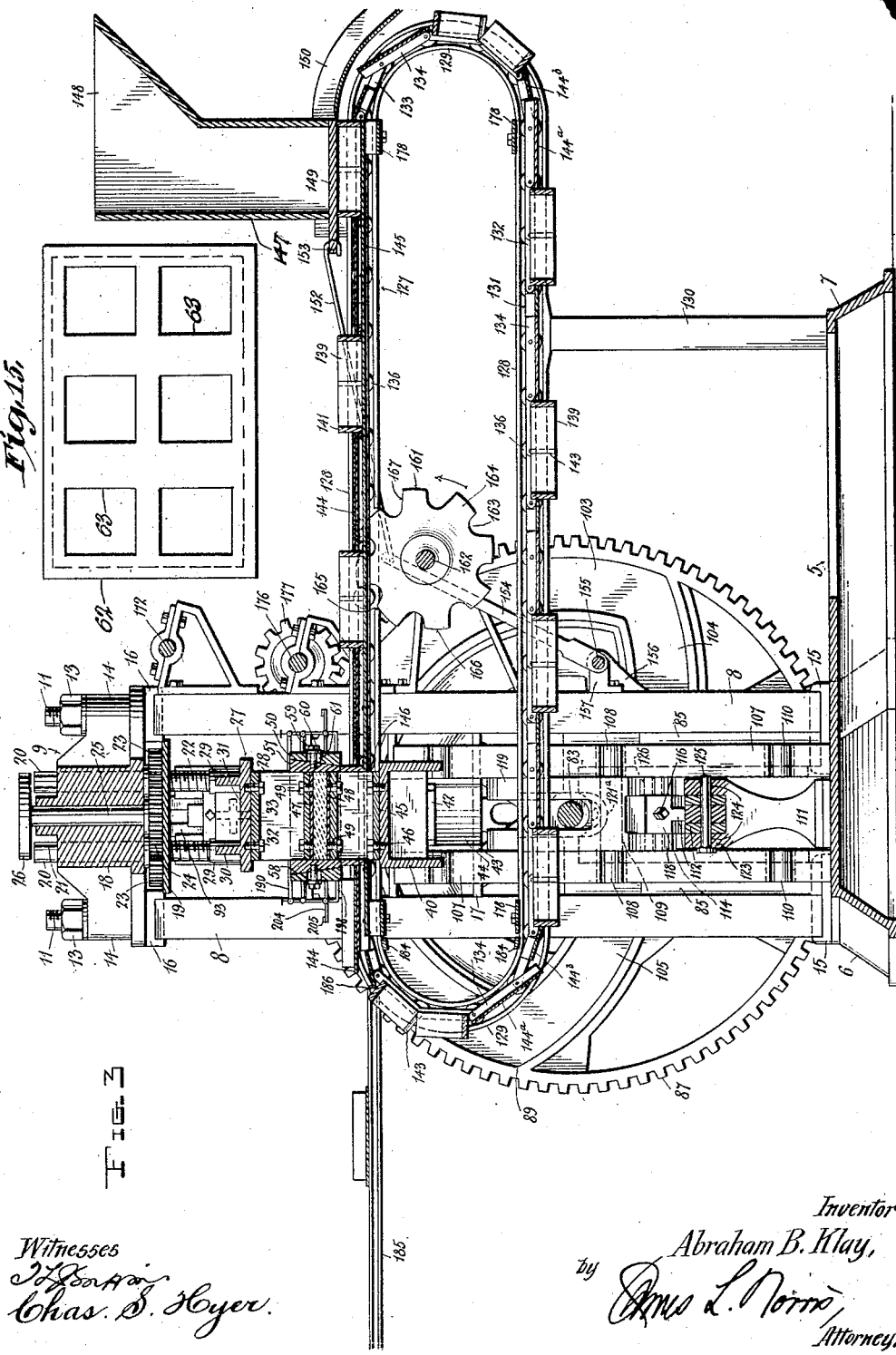
Witnesses
Chas. D. Hyer.
Inventor
Abraham B. Klay,
by
Attorney.

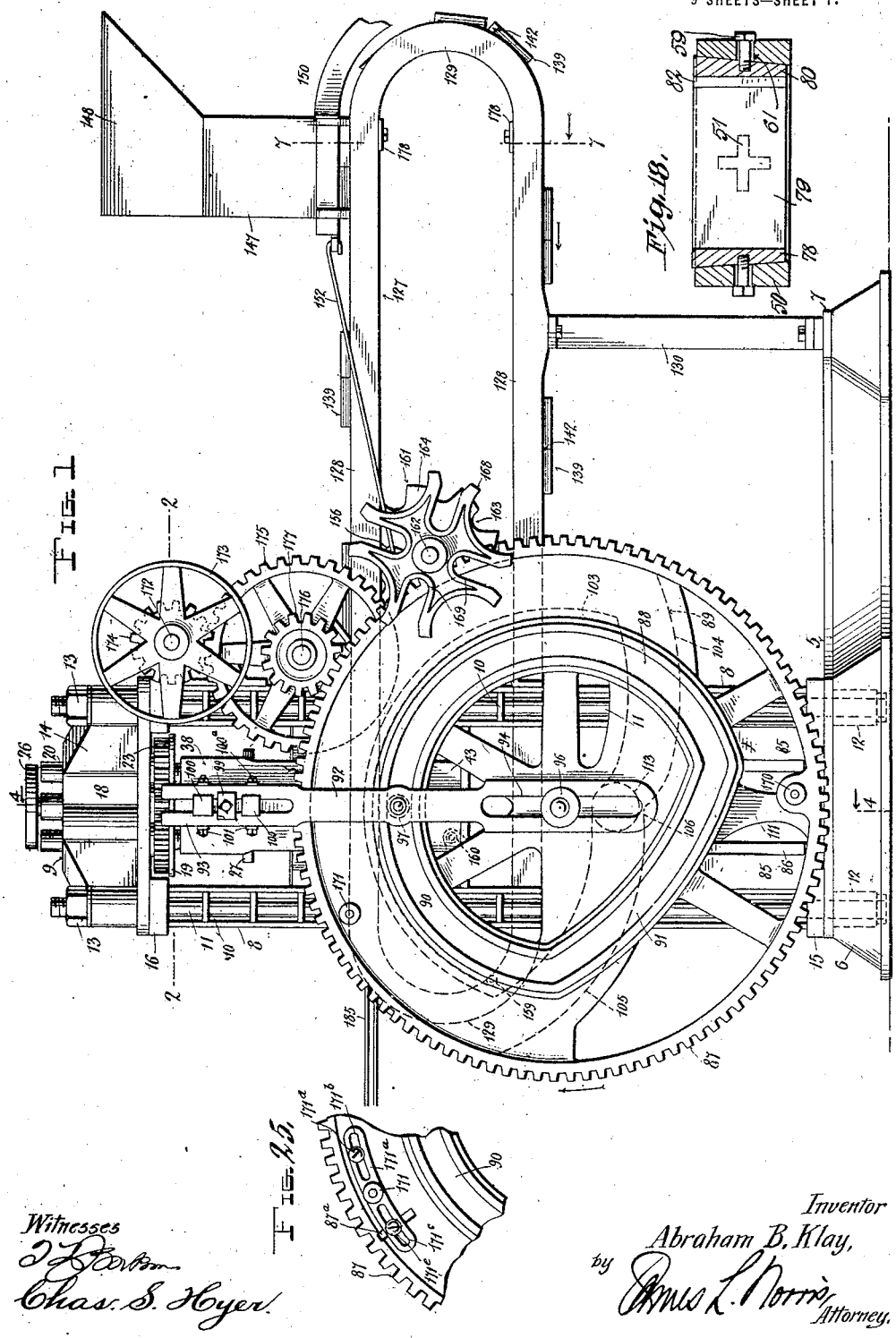

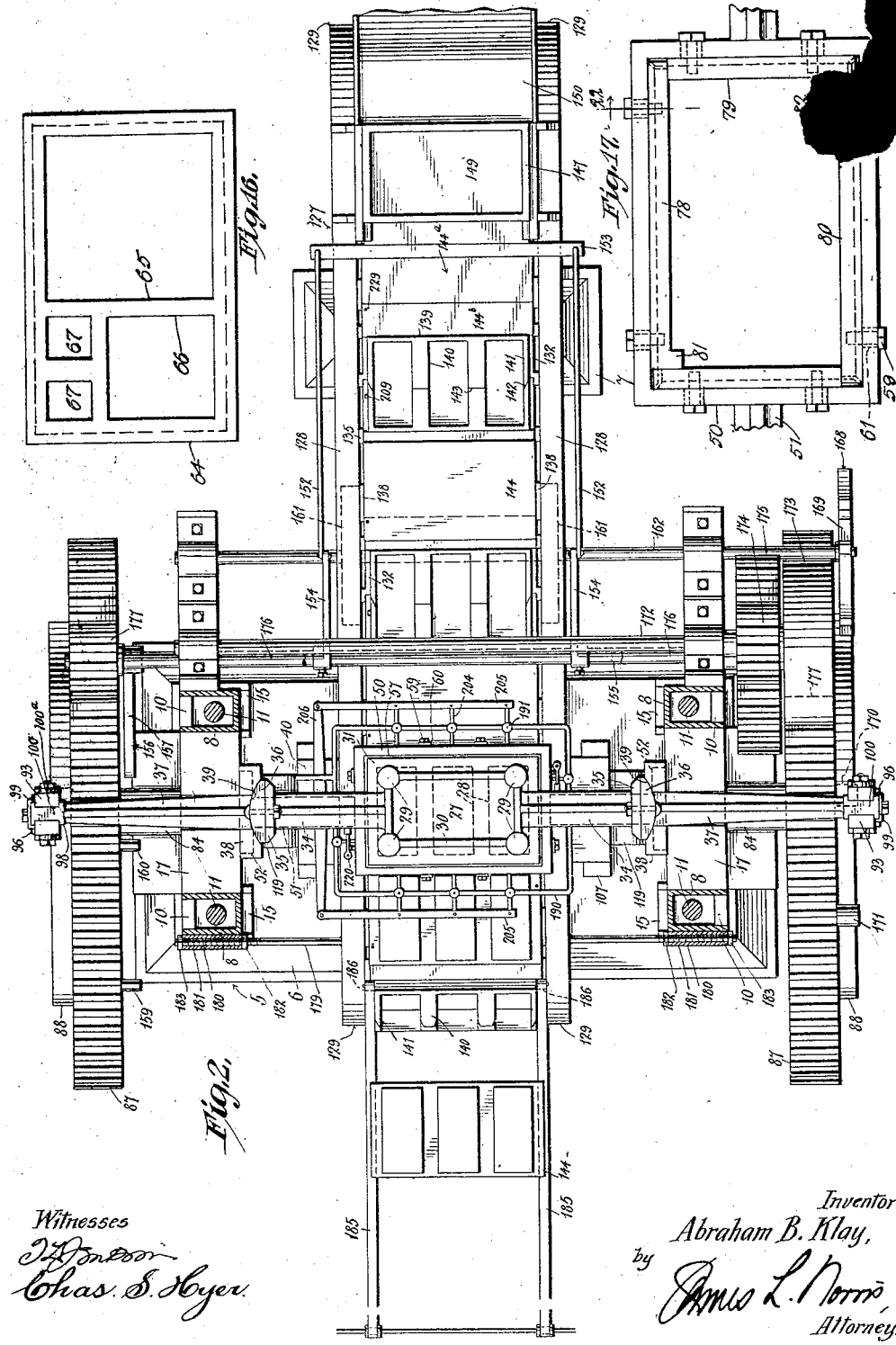

A. B. KLAY.
MACHINE FOR PRESSING AND SHAPING PLASTIC WARE.
APPLICATION FILED JULY 7, 1916.
1,295,760.
Patented Feb. 25, 1919.
9 SHEETS—SHEET 4.
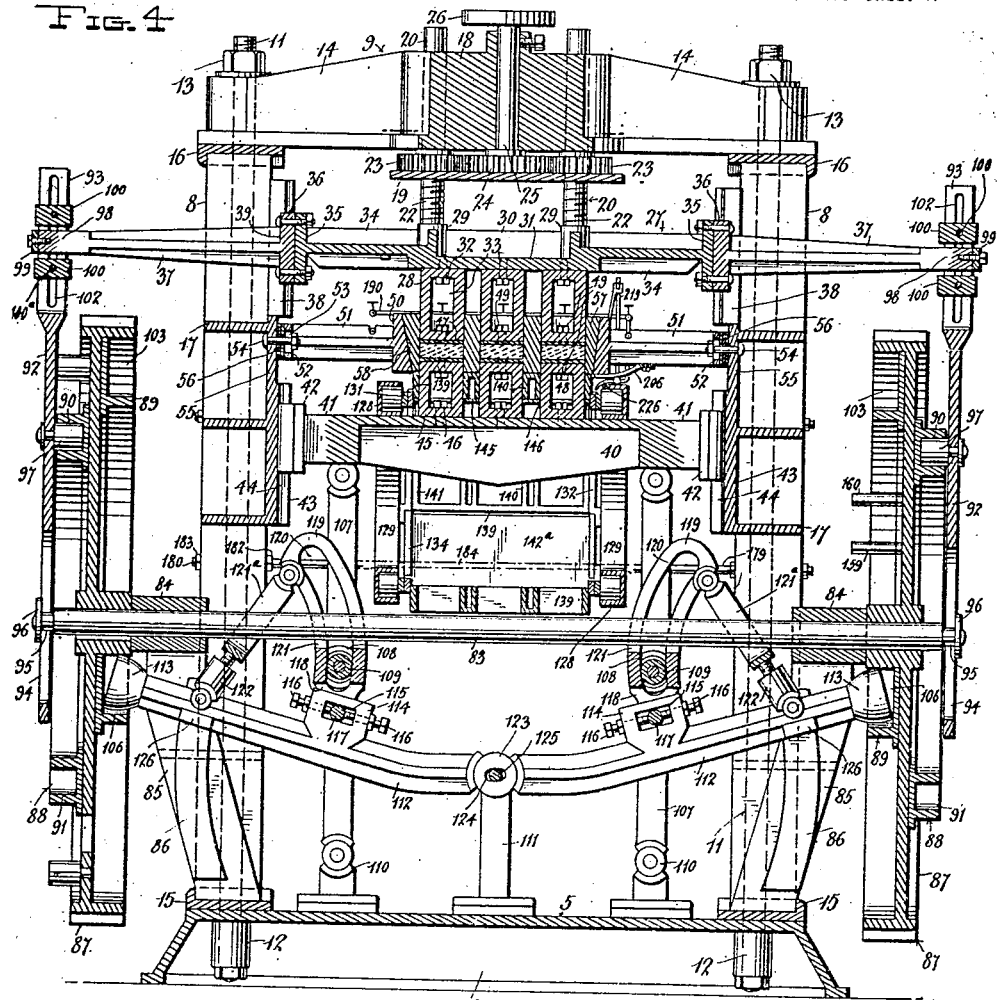
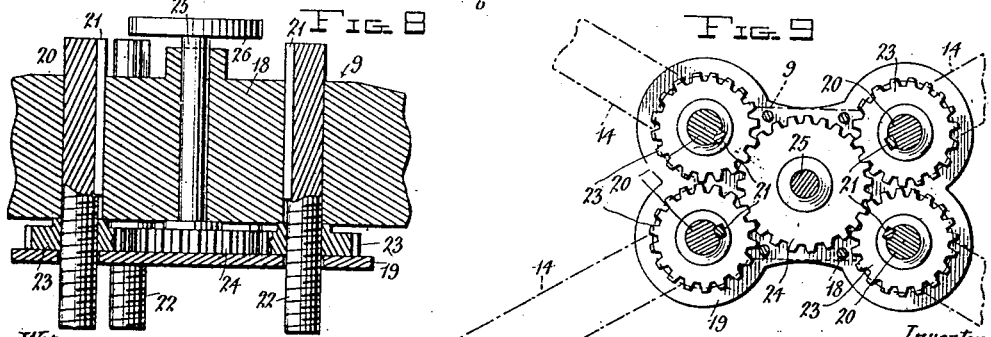
Witnesses
Inventor
Abraham B. Klay,
by
Attorney.

A. B. KLAY.
MACHINE FOR PRESSING AND SHAPING PLASTIC WARE.
APPLICATION FILED JULY 7, 1916.

1,295,760.

Patented Feb. 25, 1919.
9 SHEETS—SHEET 5.

Witnesses
Inventor
Abraham B. Klay,
by James L. Norris,
Attorney

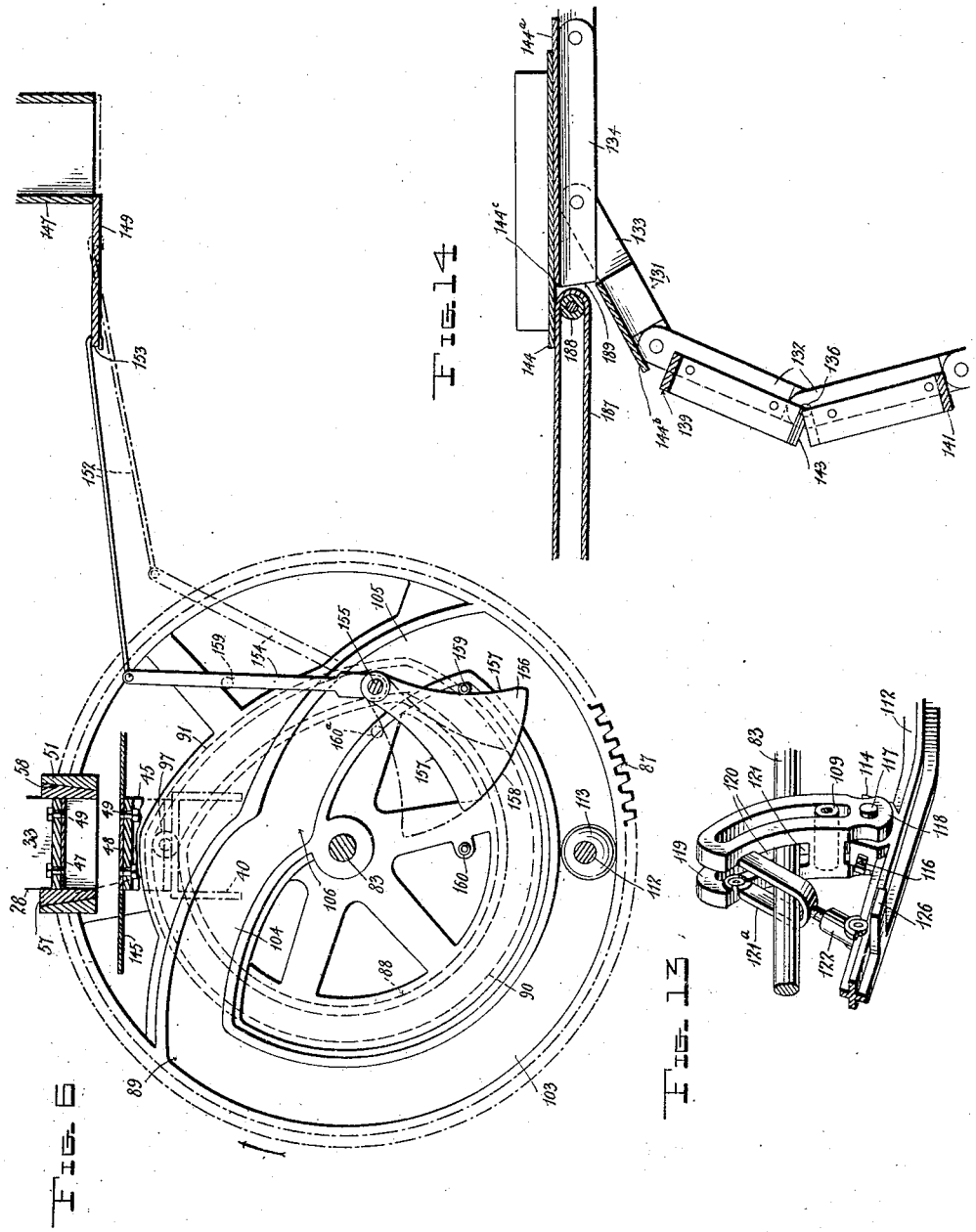

A. B. KLAY.
MACHINE FOR PRESSING AND SHAPING PLASTIC WARE.
APPLICATION FILED JULY 7, 1916.
1,295,760.
Patented Feb. 25, 1919.
9 SHEETS—SHEET 7.
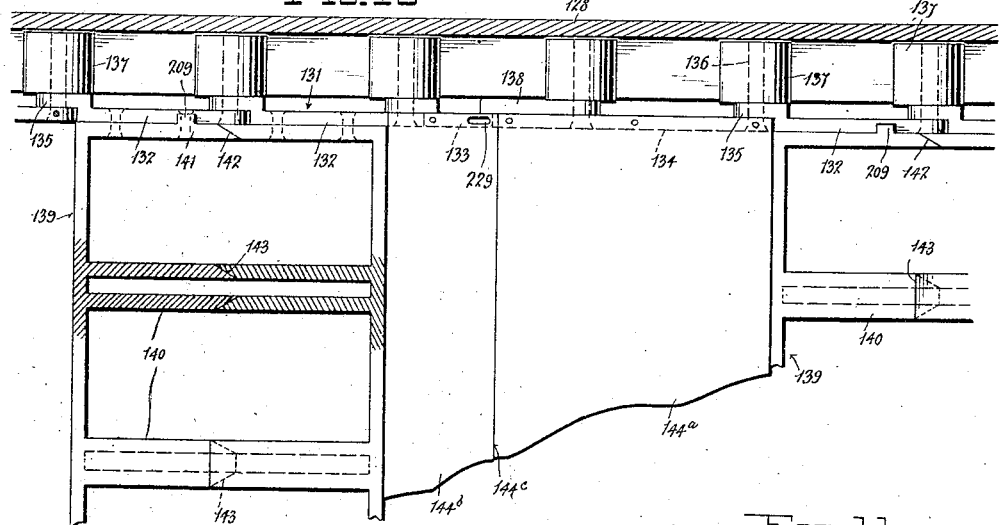
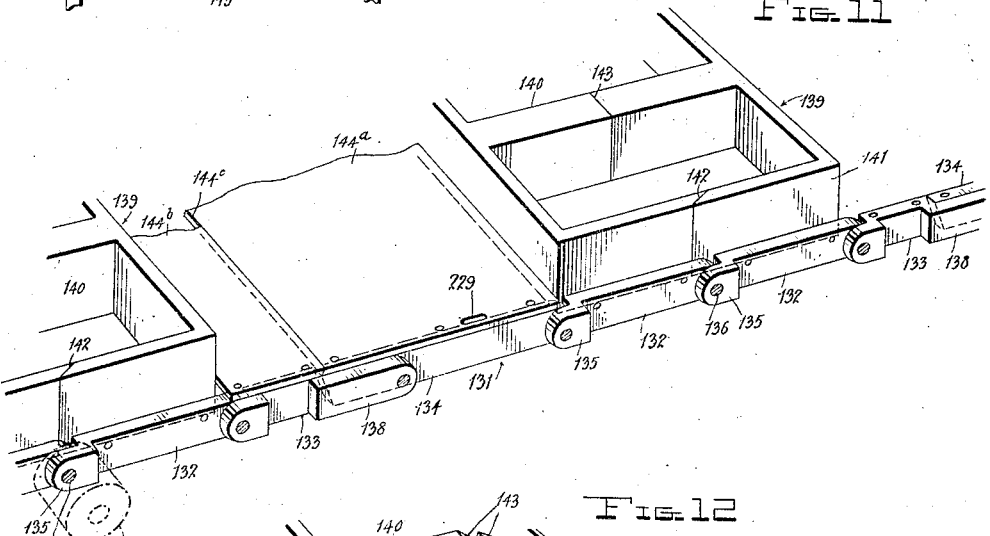
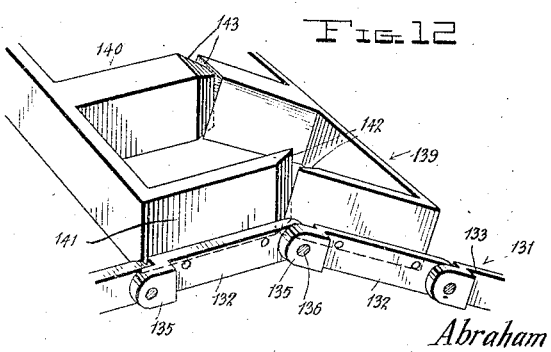
Witnesses
Inventor
Abraham B. Klay,
by
James L. Norris,
Attorney.

A. B. KLAY.
MACHINE FOR PRESSING AND SHAPING PLASTIC WARE.
APPLICATION FILED JULY 7, 1916.

1,295,760.

Patented Feb. 25, 1919.
9 SHEETS—SHEET 8.

Witnesses
J. L. Borton
Chas. S. Hyer.

Inventor
Abraham B. Klay,
by James L. Norris
Attorney.

A. B. KLAY.
MACHINE FOR PRESSING AND SHAPING PLASTIC WARE.
APPLICATION FILED JULY 7, 1916.
1,295,760.
Patented Feb. 25, 1919.
9 SHEETS—SHEET 9.
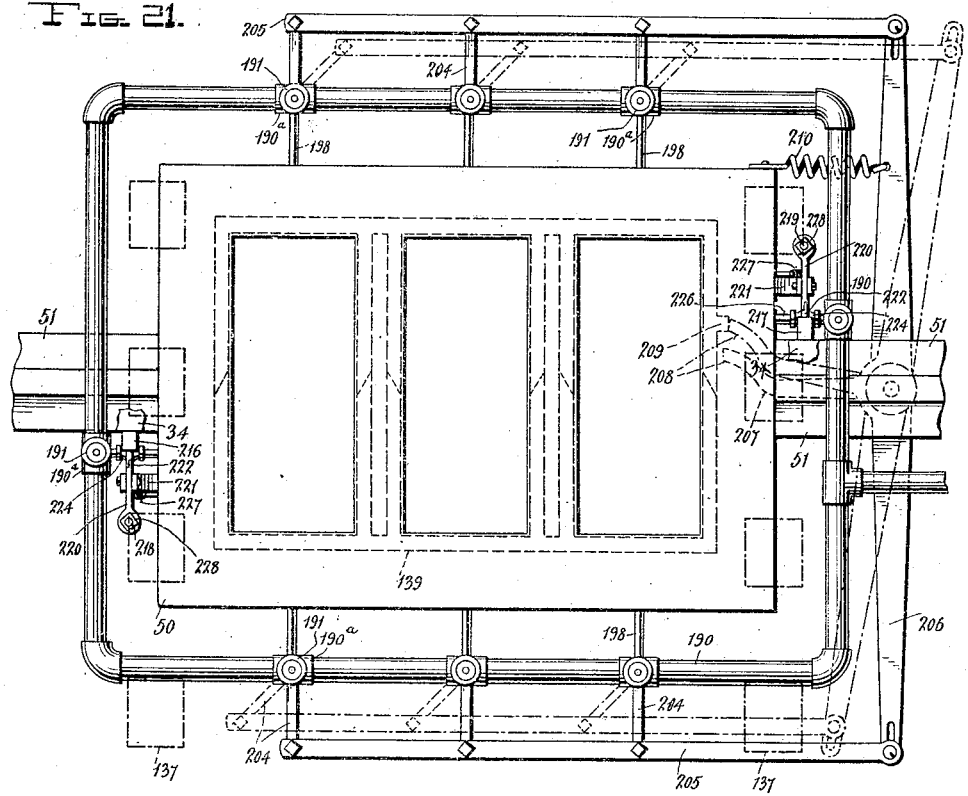
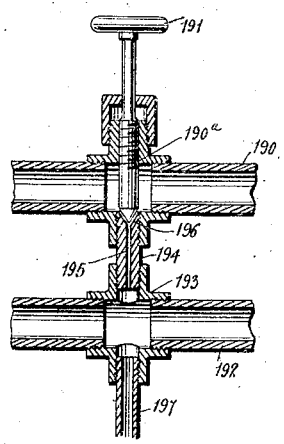
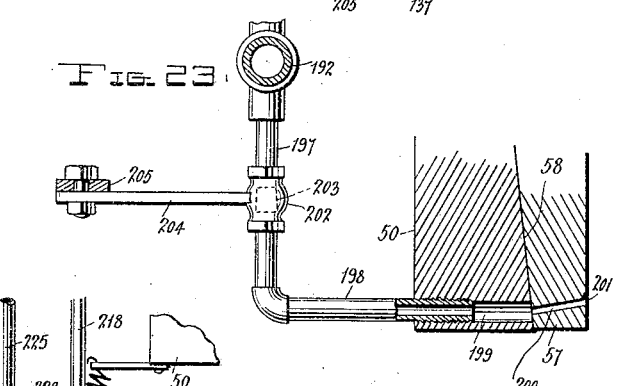
Witnesses
Inventor
Abraham B. Klay,
by
Attorney.

UNITED STATES PATENT OFFICE.

ABRAHAM B. KLAY, OF MODESTO, CALIFORNIA.

MACHINE FOR PRESSING AND SHAPING PLASTIC WARE.

1,295,760.

Specification of Letters Patent.

Patented Feb. 25, 1919.

Application filed July 7, 1916. Serial No. 108,052.

*To all whom it may concern:*

Be it known that I, ABRAHAM B. KLAY, a citizen of the United States, residing at Modesto, in the county of Stanislaus and State of California, have invented new and useful Improvements in Machines for Pressing and Shaping Plastic Ware, of which the following is a specification.

This invention relates to machines for pressing plastic material into different forms for producing ware of various types. This machine embodies an endless arrangement of carriers or boxes for plastic material or clay operating in sequence by an intermittent movement in conjunction with a charging means and with pressing mechanism of a novel construction. The invention also comprehends the provision of a plurality of carriers for plastic material or clay having an intermittent movement relatively to the pressing mechanism and alternated by a corresponding plurality of pallets or receivers for the pressed ware which is delivered thereto by a part of the pressing mechanism whereby a sequential operation may be expeditionsly effected and the output of the machine materially increased. The improved machine also embodies coöperating devices and mechanism so interrelated and timed as to render the operation of pressing and shaping various kinds of ware entirely automatic and with certainty and positiveness as to the result, the mechanism being comparatively simple in its construction and organization and capable of adjustment to vary the pressure or to accommodate the production of ware of different thicknesses.

An embodiment of the invention is disclosed in the accompanying drawings to illustrate one practical organization of devices and mechanical elements to accomplish the result sought, and this disclosure of the machine will be hereinafter more particularly described. It will be understood, however, that the invention is not limited in its scope to the exact mechanisms shown and that other mechanisms having the same functions and operations may be adopted and used. The special object of the present machine is to simplify the construction and operation of presses of this type as much as possible and to insure a maximum efficiency in the production of different kinds of ware by the use of a single machine and wherein different forms of dies and plungers may be used and substituted one for the other with convenience and facility.

In the drawings:

Figure 1 is a side elevation of a machine for pressing plastic material embodying the features of the invention.

Fig. 2 is a horizontal section taken in the plane of the line 2—2, Fig. 1.

Fig. 3 is a central longitudinal vertical section of the improved machine.

Fig. 4 is a transverse vertical section taken in the plane of the line 4—4, Fig. 1.

Fig. 6 is a diagrammatic sectional elevation of part of the mechanism and particularly illustrating the operating devices for the gate and cutoff slide of the plastic material charging hopper.

Fig. 8 is an enlarged detail cross-section through a portion of the cap and adjustable stop devices which coöperate with the upper plunger organization.

Fig. 9 is a horizontal section taken in the plane of the line 9—9, Fig. 4, showing parts added in dotted lines.

Fig. 10 is an enlarged horizontal section of a portion of the plastic material carriers or boxes and conveyer therefor.

Fig. 11 is a detail perspective view of a portion of the plastic material carriers or boxes and conveyer.

Fig. 12 is a detail perspective view of a portion of the conveyer and one of the carriers or boxes for the plastic material and illustrating the jointure of the box to permit it to pass over the ends of the conveyer frame or support.

Fig. 13 is a detail perspective view of the leverage controlling mechanism at one side and a portion of the shaft adjacent thereto.

Fig. 14 is a detail longitudinal vertical section of a portion of the conveyer, a pallet and the take-off mechanism for the pallet carrying the completely formed ware.

Figs. 15 16 illustrate detail plan views of different forms of dies that may be used with the machine and which will be included in the equipment thereof.

Fig. 17 is a top plan view of a roofing tile die shown mounted in a die box or holder and also included in the equipment of the improved machine.

Fig. 18 is a transverse vertical section on the line 22—22, Fig. 17.

Figure 19:
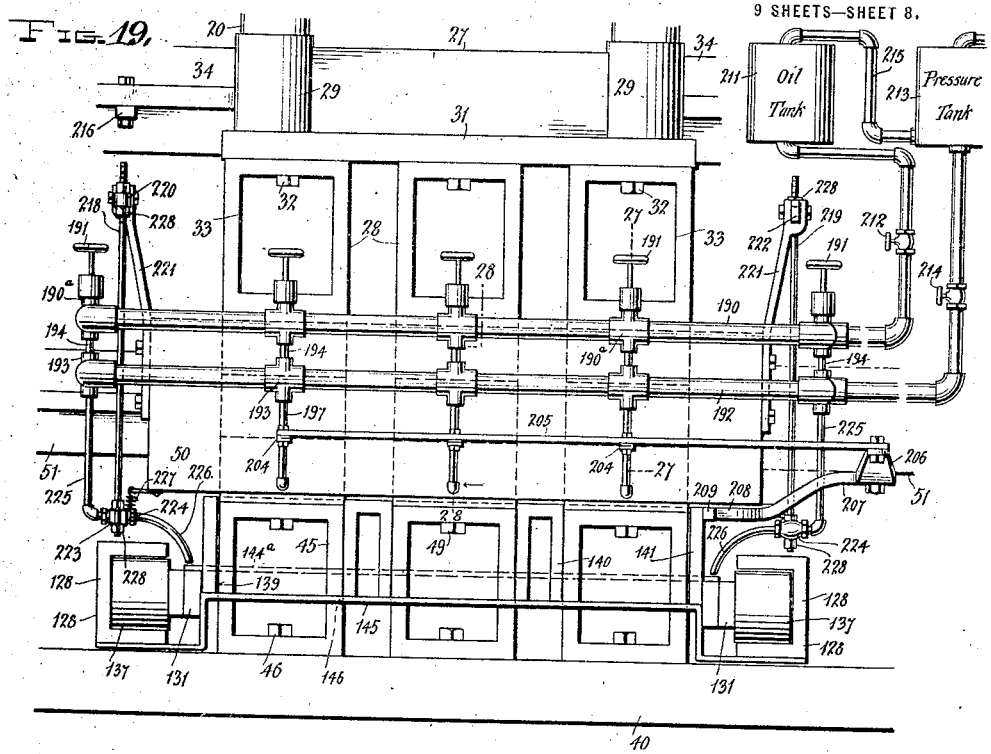

Fig. 19 is an enlarged detail side elevation of the die box and upper and lower plungers and portions of their cross-heads, a portion of the conveyer frame and conveyers, bottom plate and conveyer plates being shown in cross-section, illustrating lubricating attachments forming part of the improved machine.

Figure 20:
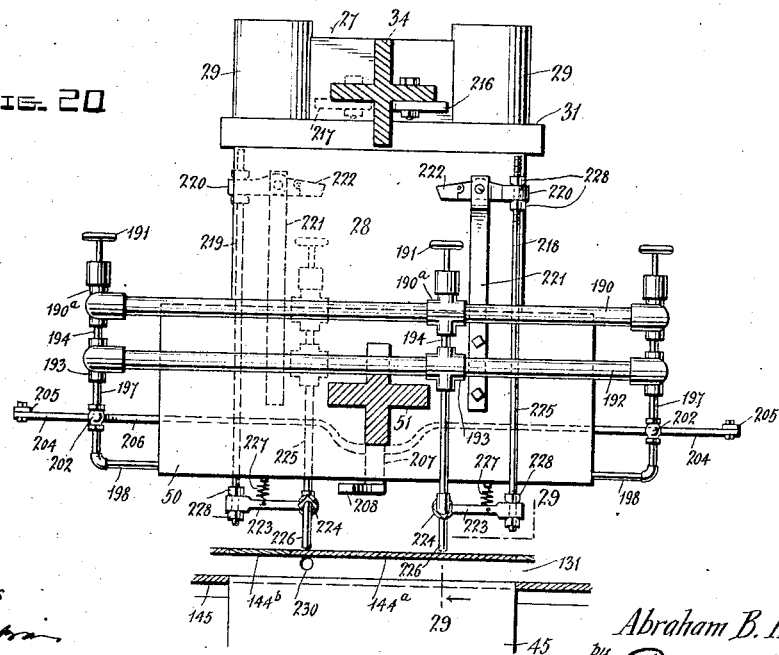

Fig. 20 is an end elevation of the devices shown by Fig. 19 with a part of the conveyer frame in longitudinal section and a part of the upper cross-head in cross-section.

Fig. 21 is a top plan view of the die box showing the lubricating attachments in full and dotted line positions.

Fig. 22 is an enlarged transverse vertical section taken in the plane of the line 27—27, Fig. 19.

Fig. 23 is an enlarged detail transverse section taken in the plane of the line 28—28, Fig. 19.

Fig. 24 is an enlarged section taken in the plane of the line 29—29, Fig. 20, and transversely through a portion of the conveyer frame and one conveyer.

Fig. 25 is a detail elevation of a part of the mechanism showing a further modification.

The numeral 5 designates a supporting base which in the present instance consists of a transverse main element 6 having a longitudinal extension 7 intersecting the center of the said main element and giving the base a substantially T-form. It will be understood, however, that this base may be modified as desired and any shape may be used for the purpose of effectively supporting or giving the mechanism above a stable rest. Pairs of hollow uprights 8 rise from opposite ends of the element 6, and connected to and resting upon the upper ends of the uprights is a frame cap or head 9 preferably of the form shown. The uprights 8 are reinforced throughout their vertical extent by webs 10 arranged at intervals, as shown by Fig. 2, and extending through the said uprights are rods 11 connected to the base as at 12, see Fig. 4, and provided with upper screw-threaded ends, securing nuts and washers, as at 13, the washers and nuts engaging the upper surfaces of the terminals of radiating arms 14 comprised in the construction of the cap or head 9. The lower ends of the uprights 8 engage foot rests 15 which are held upon or form a part of the opposite extremities of the element 6 of the base 5. The upper ends of the uprights 8 preferably have connecting braces in the form of longitudinal tie plates 16, the ends of the arms 14 of the frame cap or head 9 engaging the longitudinal tie plates directly over the upper ends of the uprights. Suitable openings will be formed in the base element 6 and in the tie plates 16 to permit the rods 11 to pass therethrough and of such dimensions as to compensate for the adjustment of the uprights as may be required. The webs 10 extend only partially over the interior of the uprights 8, as shown by Fig. 2, so as to give ample room for the adjustment of said uprights relatively to the rods 11. It will be seen that the foot rests 15 and the tie plates 16 are of such width as to permit the uprights 8 to have considerable adjustment without disengagement of the ends of the uprights with relation to the said rests and tie plates. The pairs of uprights 8 at opposite ends of the base element 6 are spaced a sufficient distance to permit the passage therebetween of parts of mechanism, and the inner opposing sides of these uprights are connected by cross webs or braces 17 which are mainly located at the upper portions of the uprights and render the latter strong and durable and also provide for pressing and positioning bearing means for vertically movable parts of the mechanism as will be hereinafter specified and also serve as convenient means for assembling the uprights on the base element 6 and for uniformly adjusting the pairs of uprights at opposite ends of the said element. The structure of the base, uprights and frame cap or head engaging the upper ends of the uprights as just explained is a preferred construction but may be varied as found necessary without in the least modifying the function and general construction of the working parts of the machine. One of the objects of this particular frame structure is to lighten the parts thereof as much as possible without in the least detracting from the necessary strength and durability of the same and also to provide for the convenient assemblage of the remaining working parts of the machine.

The cap or head 9 has a central solid body 18 from which the arms 14 radiate, and the form of this body is preferably that shown by dotted lines in Fig. 9. Immediately below this body is a horizontally disposed supporting plate 19 of essentially the same contour as the body, but slightly larger, and around the center of the body and plate and adjustably extending through both of the latter are pressure resisting posts or stops 20 which are mounted in the body 18 through the medium of suitable grooves and keys, as at 21, see Fig. 8, and whereby the stops may be adjusted vertically without rotation, the keys engaging grooves formed both in the body 18 and the stops. The stops are each formed of a comparatively short length of rod which is exteriorly screw-threaded, as at 22, and engaging each rod is a pinion 23 which is rotatably supported in horizontal position by the plate 19. All of the pinions 23 are held in continual mesh with a central gear 24 fixed on the lower end of a short shaft 25 projecting upwardly through the center of the body 18 and having a suitable turn-head or hand-wheel 26 on the upper end thereof. By rotating the shaft 25 in opposite directions through the medium of the turn-head or hand-wheel 26 the gear 24 is correspondingly rotated and all of the pinions 23 are simultaneously actuated to shift the stop posts or rods 22 upwardly or downwardly as may be desired to limit the vertical movement of a cross-head 27 mounted immediately below the said stop posts and carrying a plurality of plungers 28 which depend in regular spaced relation from the lower side thereof. The cross-head 27 has contacts 29 in the form of suitable bosses or elevated members for engagement by the lower ends of the posts 20, there being the same number of these contacts as there are posts so that the resisting pressure on the cross-head will be equally applied at four points around the center of the body thereof. The cross-head 27 preferably has a central box-like body 30 with a flat bottom 31 from which the plungers 28 depend, the contacts 29 being disposed at the corners of the said body, as clearly shown by Fig. 2. This central box-like body materially lightens the structure of the cross-head and also provides for applying the plungers 28 in a convenient manner, said plungers being removably connected by screw bolts or analogous devices 32, the plungers being formed hollow, as at 33, for conveniently applying and manipulating the said bolts and whereby one set of plungers may be replaced by another in accordance with the character and contour of the ware that is to be shaped or produced by the operation of the plungers. From the center of the opposite ends of the box-like body 30, arms 34 extend outwardly and have terminal coupling heads 35 which are bolted or otherwise fastened to slides 36 secured to or forming parts of the inner ends of actuating arms 37, the outer ends of the arms 37 being engaged by operating mechanism for regularly reciprocating the cross-head and the plungers 28 therewith in proper timed relation to the actuation of the complemental mechanism for instituting a pressure relatively to the plastic material. The slides 36 engage suitably grooved or recessed guides 38 secured to the adjacent portions of the cross-webs or braces 17 of the uprights 8, the outer faces of the slides 36 being of convex form, as at 39, see Fig. 2, and the grooves or recesses in the guides are of corresponding contour so that the said slides will have easy movement in the guides and effect a positive actuation of the cross-head 27 as an entirety and also maintain the latter head, especially at the center, in true working position or so that all of the plungers 28 will have a uniform depression and elevation.

Below the cross-head 27 a second cross-head 40 is located and consists of a hollow body of approximately rectangular form having short arms 41 projecting from opposite ends thereof and provided with slides 42 engaging guides 43 secured to the adjacent webs 17 of the uprights 8, the said guides having concave seats 44 and the slides 42 convex faces to closely fit and freely move in the said seats. The body portion of the cross-head 40 has a series of plungers 45 removably secured thereto by screw bolts 46, and these plungers 45 are in direct alinement with the plungers 28 above. The cross-head 40 having the plungers 45 is operated to have approaching and receding movements relatively to the plungers 28 of the cross-head 27, and both sets of plungers 28 and 45 have face or pressure plates 47 and 48 removably secured to the free ends thereof by screw bolts 49. The plungers 28 and 45 compress the plastic material or clay relatively to a formative means having a certain contour and as shown by Figs. 2, 3, 4 and 5 the said plungers are shaped to produce bricks of usual dimensions or of any other dimensions that may be desired, and there are three plungers in each group, which will clearly indicate that three bricks are made at each operation of the plunger.

Between the plungers 28 and 45 a die box 50 is held in fixed horizontal position by arms 51 having outer terminal securing flanges 52 which are vertically slotted, as at 53, to receive bolts 54 engaging supporting plates 55 which are preferably a part of the guides 43 for the slides 42 of the cross-head 40. By means of the slotted flanges 52 the die box 50 may be adjusted vertically either upwardly or downwardly to provide for varying the thickness of the pressed plastic material which is forced into the die box. Between the flanges 52 and the supporting plate or extension 55 shims 56 are introduced when the machine is primarily constructed, and after operation of the machine for some time it may be found necessary to adjust the parts as hereinbefore explained to compensate for wear, the adjustment being mainly accomplished through the movement of the pairs of uprights 8. It is obvious that if no means were provided for lessening the distance between the outer surfaces of the flanges 52 it would be impossible to shift the pairs of uprights 8 inwardly to adjust said uprights to compensate for wear and to maintain the parts in central position or to always preserve an accurate registration of the plungers 28 and 45 with the die box. Hence the shims 56 between the flanges 52 and the supporting plates or extensions 55 are adopted, and when the adjustment of the uprights 8 is found necessary and made one or more of the shims 56 are removed so as to permit inward movement of the uprights 8. Within the die box 50 a die 57 is mounted, this die as shown by Figs. 2, 3, 4 and 5 having a structure which will permit the formation of bricks as hereinbefore explained, and said die has beveled outer surfaces 58 to engage correspondingly beveled surfaces of the die box, the die 57 being adjustable in the die box through the medium of screw-bolts 59 engaging washers 60 against the outer surface of the die box, the screw bolts projecting through slots 61 formed in the die box walls. By means of these screw bolts and slots the die may be adjusted within the die box to vary the position thereof relatively to the thickness of the ware to be produced and in accordance with the adjustment of the plungers 28 and 45 and of the die box 50, the adjustment of the latter being accomplished through the medium of the flanges 52 as hereinbefore explained. The character of the dies used within the die box 50 may be varied indefinitely as shown by Figs. 15 and 16, the die shown by Figs. 2, 3, 4 and 5 and adapted for forming brick of rectangular form may be used. The die 62 shown by Fig. 15 has a plurality of square openings 63 therein for forming either thick or thin ware in groups of six articles at one operation. The die 64, as shown by Fig. 16, has an enlarged opening 65, a smaller opening 66, and still smaller opening 67 formed therein and all of square form to produce a plurality of pressed articles or ware of different sizes by the use of one die and all having a similar contour. The die shown by Figs. 17 and 18 is composed of a plurality of adjustable die members 77, 78, 79 and 80 which have a movable association relatively to each other to increase or decrease the dimensions of the opening defined by the inner surfaces of the said members 77 to 80, inclusive, to produce different sizes of roofing tile. It will be seen that the side members 78 and 80 of this sectional die have angular end extensions 81 and 82 overlapping or extending inwardly over the adjacent ends of the end members 77 and 79, and the side members 78 and 80 and the end members 77 and 79 are respectively shorter than the inner side and end walls of the die box 50 so that the said sectional die members may be adjusted within the limits or inside area of the die box to increase or decrease the opening defined by the inner sides of the members 77 to 80 inclusive. It is obvious that when the members 77 to 80 of the sectional die shown by Figs. 17 and 18 are depressed within the die box 50 the opening defined by the inner sides of the said members will be decreased in dimensions, and, conversely, as the members 77 to 80 inclusive are elevated in the die box the opening between the inner sides of these members will be increased, and in addition to the adjusting screws, slots and washers specified in connection with the die box illustrated by Figs. 2, 3, 4 and 5, the die box 50 as shown by Figs. 17 and 18 also has similar adjusting screws, slots and washers formed in and associated with the ends thereof to adjust the end members or sections 77 and 79. The overlapping ends of the members 77 to 80 inclusive provide for the formation of tight joints at the corners of the die opening defined by the inner sides of the said members to prevent the plastic material from escaping or being pressed through the joints, this disadvantage being incident to a number of known constructions and which detracts very materially from the quality of the product. It is apparent that by properly adjusting the members 77 to 80 inclusive the ends thereof will associate so snugly that there will be no crevices or interstices for the escape of the plastic material at the corners of the die opening. From the foregoing it will be seen that dies of various types may be used with the improved machine and introduced in the same die box, and when dies having openings of various contours or a number of openings of the same contour are employed in the die box or substituted one for another the plungers 28 and 45 may be accordingly varied and others substituted for those to correspond to the contours of the die openings of the several dies that are capable of use in the die box. Hence the several screws holding the plungers 28 and 45 are used and when the different forms of plungers are employed to correspond to the dies in the die box they will be similarly attached to the cross-heads and will be provided with pressing plates in the same manner as those shown in Figs. 2, 3, 4 and 5 so as to bring proper surfaces of the opposing plungers in contact with the plastic material and in coöperation with the die box and die contained therein.

The lower plungers 45 have plastic material or clay brought thereover and said plungers operate to force the said plastic material upwardly into the die box and die against the resistance of the plungers 28, which also descend and have their terminal plates enter the die box so that the pressure will be exerted mainly in an upward direction within the die by the plungers 45 against the resistance offered by the upper plungers 28 which are then caused to engage against the stop posts or adjustable pressure resisting means 20. After the brick, tile or other ware has been fully pressed in accordance with the adjustment of the cross-heads and coöperating parts, the plungers 45 descend and subsequently at a proper interval the plungers 28 descend through the die and die box and force the molded or pressed ware onto means for carrying the same away from beneath the die box. The plungers 28 then ascend and the plungers 45 again force the plastic material or clay upwardly into the die box 50 and die 57, or any other die that may be used, and the same operation ensues and whereby ware of different shapes and thicknesses may be expeditiously completed and ready for drying and subsequent burning.

Figure 5:
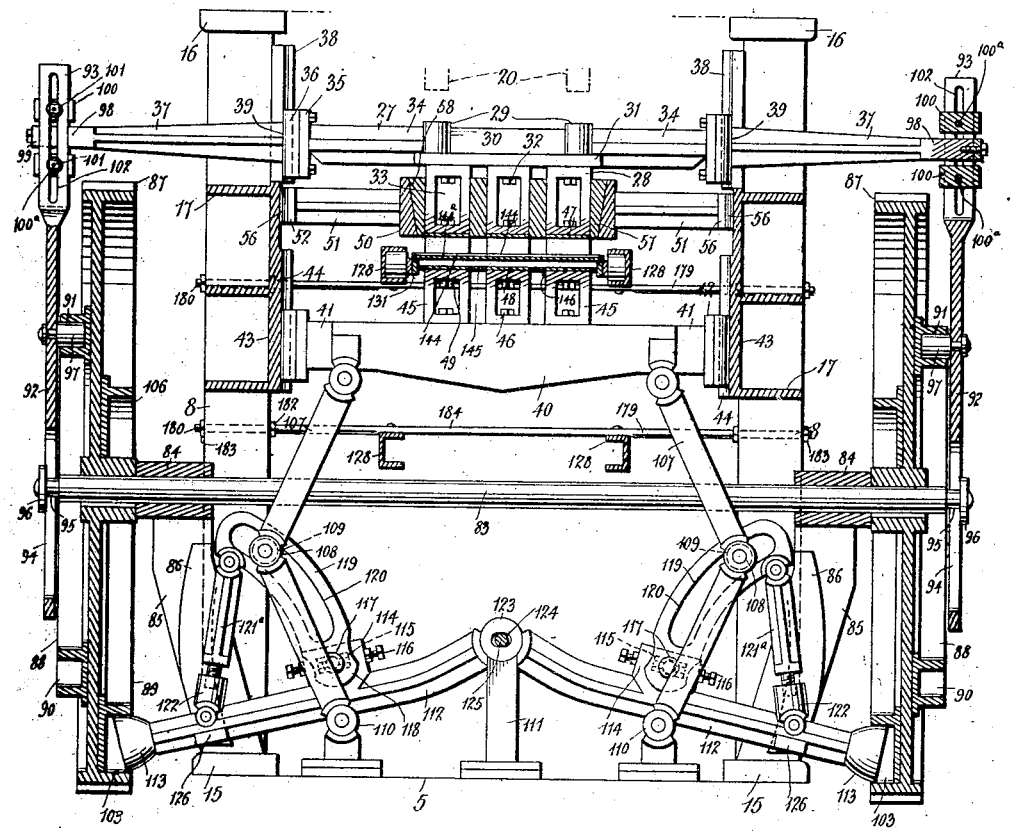
Fig. 5 is a view similar to Fig. 4 with a part of the other mechanism removed and showing the lower leverage controlling mechanism in a different position.
Figure 7:
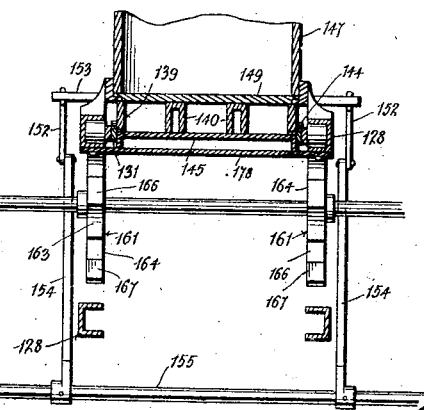
Fig. 7 is a transverse vertical section taken in the plane of the line 7—7, Fig. 1, looking in the direction of the arrows and showing a part of the operating mechanism particularly engaging the conveyer.

Various mechanisms might be adopted for operating the upper and lower cross-heads 27 and 40 and the plungers carried by said cross-heads, but after considerable experiment and analysis of the best mechanism of a comparatively simplified type the preferred form of operating mechanism as shown in the drawings has been adopted for the reason that it may be readily installed and is positive in its action as well as adjustable to compensate for variation in the degree of reciprocation or approach and recession of the two cross-heads and their plungers relatively to the die box 50 which is maintained at all times in a fixed horizontal position while the plungers are operating. This preferred mechanism comprises a transversely extending motion transmitting shaft 83 passing between the pairs of uprights 8 and mounted in suitable bearings 84 held on the upper ends of pairs of supports 85 rising from the ends of the element 6 of the base and extending slightly outwardly from the latter at an angle, as clearly shown by Fig. 4. Each pair of supports 85 has an opening between the members thereof fully from the lower terminals adjacent to the element 6 of the base upwardly to the bearing 84, the members of the said supports on their inner opposing sides having guide ribs 86 extending from the lower terminals thereof upwardly to a point near the bearings 84. These guide ribs 86 may be dressed off as desired and their purpose will be more fully hereinafter explained. On the opposite ends of the shaft 83 spur gears 87 are keyed, each of said spur gears also serving as a cam and having outer and inner cam races or ways 88 and 89. Each cam way 88 has a concentric portion 90 and an eccentric portion 91. Vertically reciprocating bars or rods 92 are actuated by the cams or cam races 88 on the outer sides of the spur gears 87, said reciprocating bars or rods 92 having upper vertically slotted or forked extremities 93 and adjustably connected to the outer ends of the arms 37 forming part of the upper cross-head 27. The lower extremities of the bars or rods 92 are longitudinally slotted, as at 94, and loosely engage the outer recessed ends 95 of the shaft 83, washers and screws 96 holding the said lower slotted ends of the bars or rods 92 in loose connection with the ends of the shaft. At an intermediate point each bar or rod 92 has a roller 97 secured thereto and engaging the race way 88 adjacent thereto and by which the bar or rod is reciprocated when the roller reaches the eccentric portion 91 of the said race way. When the roller 97 is in engagement with the concentric portion 90 of the race way 88 it is at rest, and the cross-head 27 remains immovable, but as soon as the roller passes from the concentric portion 90 to the eccentric portion 91 of the race way 88 each bar or rod 92 is depressed and the cross-head 27 with its plungers 28 is moved downwardly and remains in a depressed position until the terminal of the eccentric portion 91 of the race way 88 is reached, when the said cross-head 27 and its plungers will be raised and continue to rise for a short time after the roller 97 enters the concentric portion 90 of this race way and at such time or when the cross-head has been fully elevated it will remain immovable with the contacts 29 in engagement with the lower ends of the posts 20 and while in this position the plungers 28 will be held while the lower plungers 45 press the plastic material or clay against the plungers 28 as the means to resist pressure and effect the requisite thickness of the ware produced in accordance with the adjustment of the plungers and the die in the die box 50. The outer ends of the arms 37 of the cross-head 27 are adjustable in the upper forked or slotted extremities 93 of the bars or rods 92, each arm 37 having its outer extremity shaped approximately rectangular in cross-section, as at 98, and of a width slightly less than the width of the slot in the upper forked extremity 93 of the bar or rod 92 with which it engages, said rectangular outer extremity of the arm 37 terminating in a flanged head 99; and above and below each extremity 98 of the arm 37 slide blocks or adjusting members 100 are shiftably mounted in the slotted extremity 93 of the bar or rod 92 and are engaged by bolts 100 having suitable washers and nuts 101 and extending through slots 102 formed in the opposing members of the forked or slotted extremity 93 in planes at right angles to the slot engaged by the outer end of the arm and the blocks or adjusting members 100. Through the medium of these blocks or members 100 the outer end or extremity 98 of the arm 37 may be raised and lowered in the upper extremity of the bar or rod 92, and each arm 37 is similarly associated with the upper extremity of the bar or rod adjacent thereto and will be uniformly adjusted so as to maintain the cross-head 27 perfectly level and cause the plungers 28 to accurately register with the die box or the die mounted in the latter. The race ways 89 on the inner sides of the spur gears 87 are of the form particularly shown by Fig. 6 and each comprises a concentric portion 103 and inwardly extending eccentric portions 104 and 105 merging into each other by means of an inner drop 106. The race ways 89 are disposed, in such manner in opposing relation on the inner sides of the spur gears 87 that they will not actuate the mechanism coöperating therewith during the time that the upper cross-head 27 and its plungers 28 are operating. The inner race ways 89 form a part of and coöperate with leverage controlling mechanism and actuating devices for the lower cross-head 40 carrying the plungers 45 in a manner which will now be explained. The cross-head 40 has a pair of toggle levers 107 movably connected to the lower portion of each extremity thereof, the pairs of toggle levers associated with each extremity of the cross-head 40 being spaced apart and having intermediate joints 108 with a roller 109 extending across from one set of levers to the other or horizontally bridging the space between each pair of levers at the center thereof, the lower extremities of the pairs of levers being fulcrumed on the element 6 of the base, as at 110. The maximum upward pressure on the cross-head 40 is exerted when the pairs of toggle levers 107 have their members in vertical alinement, as clearly shown by Fig. 4, and the joints 108 at the central or intermediate portions of the pairs of toggle levers are broken at timed intervals and the levers move outwardly and effect a depression of the cross-head 40, as shown by Fig. 5. A fulcrum post 111 rises from the center of the base element 6 between the opposite pairs of toggle levers 107, and loosely fulcrumed to the upper end of said post are oppositely extending levers 112 having suitably shaped rollers 113 on their outer ends which always engage the race ways 89 on the inner sides of the spur gears 87. At a suitable distance from the inner fulcrumed end of each lever 112 and projecting upwardly therefrom is an attaching boss or projection 114 which is slotted as at 115 and has adjusting screws 116 at the inner and outer terminals thereof which project into the slot, as clearly shown by Fig. 4. The terminals of the screws 116 engage the fulcrum pin or pivot 117 which projects transversely through and beyond the opposite sides of the boss or projection 114 and engages the lower slotted end 118 of a controlling segment 119. This segment 119 is clearly shown by Fig. 13 and controls the breaking of the pairs of toggle levers 107 at certain intervals or when it is necessary that the cross-head 40 and its plungers 45 should recede or depress relatively to the die box, and to accomplish this function of the segment 119 the roller 109 extends through a slot 120 formed in the segment and of the same arcuate contour as the latter. The segment 119 is also slotted in a plane at right angles to the slot 120, as at 121, so that it may ride up over and clear the shaft 83 when the roller 113 on the outer end of the lever 112 approaches and reaches its inward maximum movement relatively to the race way 89 or when it engages the drop 106, and at such time the plungers 45 of the cross-head 40 will have reached their maximum elevation in the die box 50 and die 57. The stroke of the cross-head 40 is adjusted through the segmental controller 119, the latter having an adjusting screw rod 121ᵃ movably attached thereto and also to a socket 122 pivotally connected to the upper portion of the lever 112 near the outer end of the latter. By shortening the screw rod 121ᵃ the controller segment 119 is drawn downwardly toward the lever 112 and at the same time the fulcrum rod or pivot 117 engaging the boss or projection 114 is correspondingly shifted, and by this adjustment the cross-head 40 is given a shorter stroke or in its maximum upward movement will not approach the cross-head 27 as closely as when the controller segment 119 is moved upwardly and inwardly by lengthening the screw rod 121ᵃ and correspondingly shifting the pivot pin or fulcrum rod 117. It will therefore be seen that the movement of the lever 112 always remains the same or is uniform and that the adjustment to change the stroke of the cross-head 40 is accomplished through the change of position of the controller 119 through the screw rod 121ᵃ. This change of position of the controller 119 will, of course, modify the breaking action of the pairs of toggle levers 107 connected to the cross-head 40, and as this leverage controlling mechanism is the same on opposite sides of the center of the machine and coöperates with the opposite pairs of toggle levers 107 the opposite extremities of the cross-head 40 will be equally adjusted. As hereinbefore specified, the inner ends of the levers 112 have a fulcrum play or movement or are loosely fulcrumed at the upper end of the fulcrum post 111 to obviate binding of the two levers 112 during their operation and to effect a quick action when the levers descend or move downwardly so as to carry therewith the controller segments and expeditiously break the pairs of toggle levers 107 at their intermediate joints to rapidly lower the cross-head 40 and move the plungers 45 downwardly from the die box and out of the way of receptive means for the completely compressed ware which is expelled or removed from the die box 50 and its die 57 by the upper plungers 28 and also to clear the way under the die box 50 for the feeding means for the plastic material. This downward movement of the levers 112 is due to the particular formation of the race way or cam 89 and the latter is so shaped that the maximum upward movement of the cross-head 40 will be effected only so long as is necessary to practically compress the plastic material in the formation of the predetermined ware. To provide for this loose play at the inner fulcrumed ends of the levers 112 the upper end of the post 111 has a head 123 suitably shaped to receive the inner ends of the levers and has opposite slots 124 in which the fulcrum pin or rod 125 extending through the inner ends of the levers 112 has slight sliding movement. This loose fulcrum has the advantages and meets the contingencies above noted. Immediately below the point of attachment of the socket 122 to each lever 112 the latter has side projections 126 which have their ends in close moving relation to the opposite ribs 86 to maintain each lever 112 in central position or to obviate lateral movement thereof to any such extent as to interfere with the accurate operation of the levers and controlling segments relatively to the pairs of toggle levers 107, and by this means wear on the parts is also materially prevented; yet the several devices comprised in the leverage controlling mechanism have sufficient play to prevent binding at any point and to quickly respond to all movements imparted thereto by the cam race or cam 89 on the spur gear 87. The cam races 88 and 89 may form a part of the spur gears 87 or be applied thereto, and these cam races or cams on both spur gears 87 are in all respects similar in contour, but are, of course, reversed on the opposite spur gears and as a consequence the same actuating movement as imparted to the bars or rods 92 and the levers 112 and the reciprocation of the cross-heads 27 and 40 and their plungers will be uniformly maintained and a similar pressure will be exerted by all of the plungers relatively to the plastic material or clay in the die box 50 and die thereof, with material advantages in the production of the ware.

The cross-heads and plungers, die box and dies that may be introduced therein and the operating mechanism for the cross-heads as explained might be used with any means for regularly supplying charges of plastic material or clay to the die box and dies, but it is preferred that the plastic material or clay be regularly fed or supplied by charging means successively moving under and in registration with the die box and alternating means for receiving the completely pressed ware. Extending longitudinally of the machine between the opposite pairs of uprights 8 is a conveyer frame or support 127 consisting of upper and lower longitudinally straight tracks or ways 128 connected by curved end sections 129. These ways may be formed of suitable channel iron with the open sides disposed inwardly and the conveyer frame or support 127 as a whole projects a greater distance in advance of the main body of the machine than in rear of the same and is held in true position by uprights 130 rising from the outer ends of the longitudinal extension 7 of the base. Endless link belts 131 move within the ways of the conveyer frame or support 127 and comprise a plurality of links 132 and 133 provided at intervals with link supporting arms 134 forming part of this link organization, as clearly shown by Figs. 10, 11 and 12. The links 132 have one end of each offset or outwardly projected as at 135 to receive the ends of adjacent links, all of the links having fulcrum pins 136 which continue from or outwardly through rollers 137 movable in the ways of the conveyer frame or support 127. The links 133 have elongated offsets 138 to form seats for the link supporting arms 134, the ends of the offsets 138 being fulcrumed or pivoted to the link supporting arms 134 at a distance inwardly from the free ends of the latter, and the opposite ends of the said link supporting arms 134 are pivoted or fulcrumed to the adjacent offset 135 of the next link 132. By this means the links 133 are permitted to turn on the link supporting arms 134 when rounding the opposite extremities or ends of the conveyer frame 127 or when passing through the curved end sections 129, and when the said intermediate links 133 start to move downwardly over the rear end sections 129 from the upper horizontal ways the link supporting arms 134 at opposite sides remain horizontally straight for a time or until the ends of the said link supporting arms attached to the offsets 135 of the next links 132 in rear thereof reach the downwardly curved incline of the rear curved section 129 merging into the upper horizontal ways of the conveyer frame 127. The endless link belts or conveyers 131 have plastic material or clay carriers or boxes 139 secured thereto at intervals and spaced apart regular distances, the ends of the carriers or boxes 139 being secured to the links 132, there being a pair of the said links associated with the opposite end of each carrier or box. The carriers or boxes 139 have their lower edges about midway of the width of the link belts or conveyers 131 and are fully open at bottom and top. The contour of these carriers or boxes 139 will be varied in accordance with the contour and thickness of the ware to be produced, the boxes for making brick and like thick ware being deeper than the carriers or boxes forming flooring, roofing and other tile. These boxes are separable from the link belts or conveyers 131 and may be readily replaced by other boxes of different forms or a series of link belts or conveyers 131 may be provided as a part of the equipment of each machine and have different forms of carriers or boxes 139 secured thereto. As shown, the carriers or boxes 139 are of the construction and general contour to adapt them for carrying plastic material or clay for forming bricks and are provided with hollow partitions 140 extending transversely thereof. It is obvious that the carriers or boxes must break or should be adapted to readily pass over the opposite curved end sections 129 of the conveyer frame or support 127, and for this purpose the ends 141 and the partitions 140 are centrally divided and are separable, the said ends being constructed with overlapping bevels 142 and 143. The beveled terminals 142 of the ends 141 are formed by cutting off or mitering the same at an angle of about 45°, and the ends 143 of the sectional partitions 140 are respectively contracted by beveling and socketed to provide a close interfitting of the terminals or ends of each sectional partition. The inner ends of the pairs of links 132 have their pivot or fulcrum pins 136 disposed in alinement with the joints of the ends 141 and partitions 140 of each carrier or box so that as the links 132 break in turning or rounding the end sections 129 the carriers or boxes similarly break and will readily pass over the opposite rounded or semicircular ends of the conveyer frame or support 127. The object of beveling the joints at the ends 141 and the partitions 140 is to avoid the formation of crevices at these jointed parts and thereby prevent the plastic material or clay from working thereinto, and, moreover, this form of joint provides for a smoother formation on the interior of the several parts of each carrier or box. The distance between the carriers or boxes 139 is such as to permit the introduction of removable pallets 144 which are somewhat longer than the carriers or boxes, the ends of the pallets resting on thin sheet metal plates composed of separable sections 144ª and 144ᵇ secured at their ends on the links 133 and the link arms 134, said plate sections having a beveled joint as at 144ᶜ so as to form a tight closure when the plates are in horizontal position. These sectional plates break when rounding the semicircular end sections 129 regularly with the link devices to which they are attached, and the total width of the said plate sections about equals the distance between the sides of adjacent carriers or boxes 139. The link supporting arms 134 are long enough to give the pallets a stable support for a sufficient length of time to effect a take-off or withdrawal of the pallets carrying the completed ware when the arms 134 reach the rear curved end section 129 of the conveyer frame 127. Empty pallets are applied between the carriers or boxes at the front or feed end of the conveyer frame 127 by an operator or attendant, and there will always be a pallet 144 between each pair of carriers or boxes 139. Between the upper horizontal ways 128 of the conveyer frame 127 is a sheet metal closure 145 which extends from the front curved end section 129 to the rear curved end section, and the carriers or boxes move closely against the said closure. This closure 145, therefore, provides means for closing the bottoms of the carriers or boxes 139 after the latter are charged or filled with plastic material or clay and the plungers 45 move upwardly through openings 146 formed in this closure where the latter extends over the cross-head 40. The cross-head 40 extends through and operates in the space between the upper and lower horizontal ways 128, and the distance between the closure 145 and the lower edge of the die box 50 will be such as to permit the carriers or boxes 139 to move under and register with the lower portion of the die box and then move outwardly away from the die box at intervals, and when carriers or boxes 139 of varying heights are used in accordance with the character of the ware to be produced the die box 50 may be adjusted to compensate for the difference in height of the carriers or boxes 139, and the cross-heads 27 and 40 together with their respective plungers 28 and 45 will also be correspondingly adjusted by means hereinbefore explained. The plate sections 144ª and 144ᵇ receive the pallets as hereinbefore indicated and the wider plate sections 144ª which extend approximately full length of the link arms 134 will conjointly act with the latter as supporting means for the pallets when the latter are taken off at the delivery end of the conveyer frame 127. The plate sections 144ª and 144ᵇ when arriving under the die box 50 will form partial compartments with the portion of the plate 145 below, the adjacent sides of the carriers or boxes 139 and the opposite links 133 and link arms 134 completing the compartments or inclosures for a purpose which will be hereinafter more particularly explained.

At the front end of the conveyer frame 127 a feed hopper 147 is mounted and extends transversely across the said frame and has an upper inlet 148 with which a spout or other feeding means from a plug mill may supply the plastic material or clay. The lower end of the hopper 147 is elevated sufficiently above the conveyer frame to permit the carriers or boxes 139 to pass thereunder, and said lower end of the hopper also has a reciprocating cut-off and clearing slide 149 which is opened when each carrier or box is directly under or registers with the lower end or bottom of the hopper 147 to permit the plastic material or clay to pass downwardly into the carrier or box, and said slide is then closed to cut off the supply of plastic material or clay from the hopper and also to clear the top portion of the carrier or box of surplus plastic material or clay or to smooth off the plastic material or clay in the carrier or box, the surplus material or clay which is removed from each carrier or box being pushed over into a chute 150 above and extending downwardly over the front curved end section 129 any suitable distance. To effect this clearance of the surplus plastic material or clay from the top of each filled carrier or box the slide closely occupies the space between the lower end of the hopper 147 and the upper edges of the carriers or boxes so that when the latter pass from beneath the hopper 147 the plastic material or clay therein will not be projected above the upper edges of the carriers or boxes and there will be no spilling or loss of the plastic material from the carriers or boxes when the latter move over the conveyer frame to the pressing devices, and, moreover, each carrier or box with its charge is in the best possible condition to pass under and register with the die box 50. It will therefore be seen that the operation of filling and transporting the charges of plastic material or clay in the manner specified is materially advantageous in that there is no loose clay falling over onto the upper part of the conveyer frame at any point and the mechanism is maintained in a comparatively cleanly condition and the plastic material or clay is preserved in medium compact form within the carriers or boxes until the latter reach or register with the die box. The cut-off and clearing slide 149 is actuated at timed intervals through the medium of rigid connecting rods 152 attached to the opposite ends of a draw bar 153 secured to the rear end of the said cut-off or clearing slide 149. The rear ends of the rods 152 are attached to rocker arms 154 fixed at their lower ends to a rock-shaft 155 mounted in suitable bearings on the uprights 8 and located below the conveyer frame 127. On the one end of this rock-shaft 155 is an oscillating cam 156 which is approximately of triangular contour and has opposite concave edges 157 and a lower extended convex edge 158. The form of this cam may be varied so long as the two concave side edges 157 are maintained in the relation shown especially by Fig. 6, and for convenience in operation the said cam is located close to the inner side of one of the cam races or cams 89 carried in turn at the inner side of one of the spur gears 87. Projecting inwardly from parts of the spur gear 87 adjacent to which the cam 156 is located are two rollers 159 and 160, and assuming that the slide 149 has been opened, as shown by dotted lines in Fig. 6, the roller 159 will at a proper interval be brought against the front concave edge 157 of the cam 156 owing to the rotation of the spur gear 87 in the direction of the arrow, said roller 159 exerting a rearward pushing action on the cam 156 which will cause a forward rocking movement of the shaft 155 and a similar forward movement of the crank arms 154 and simultaneously the rods 152 will push on the bar 153 and the slide 149 and close the latter, the said slide remaining closed until the roller 160 has rotated around the shaft 83 and reached the dotted line position at 160$^a$, when said latter roller will engage the rear concave edge 157 of the cam 156 and push the latter forwardly, as shown in full line position in Fig. 6, and again open the slide 149. This actuation of the slide or the opening and closing movements thereof as just explained occurs at regular intervals when each carrier or box 139 comes under and accurately registers with the bottom outlet of the hopper 147, the slide first opening to permit a charge of plastic material or clay to gravitate into the carrier or box under the hopper and then closing to shear or cut off the supply of plastic material and at the same time clear or level off the plastic material relatively to the top edge of each carrier or box.

The conveyers or link belts 131 together with the carriers or boxes 139 and pallets 144 are given a step by step movement over the conveyer frame 127 through the medium of Geneva wheels or gears 161 fixed on a transverse shaft 162 mounted in suitable bearings on the front portions of the uprights 8. The shaft 162 with the Geneva wheels 161 thereon extend through the conveyer frame 127 between the upper and lower horizontal ways of the latter at such elevation that the slots 163 and teeth 164 of the wheels project upwardly through slots 165 in the lower flange of the upper way 128 of the conveyer frame 127 to engage the rollers 137 of the two conveyers or link belts 131 at regular intervals. The outer edges of the teeth 164 are slightly beveled in curved planes as at 166 to effect a clearance of the teeth relatively to the parts with which they directly coöperate or so that they will readily pass between and away from the rollers 137 and also to provide one wall of each slot 163, as at 167, longer than the opposite wall of each slot in order to give ample bearing or contact and pushing action of the successive teeth on the rollers 137 with which they engage. Intermittent rotation is imparted to the shaft 162 by a controlling Geneva wheel or gear 168 secured on one end of the shaft 162 outside of the plane of one of the spur gears 87, the shaft 162 being projected at one side a greater distance than at the opposite side so as to accommodate the mounting of the Geneva wheel or gear 168. The Geneva wheel or gear 168 is provided with four slots 169, as clearly shown by Fig. 1, the slots 169 having considerable depth and engaged at intervals by two rollers 170 and 171 projecting outwardly from the spur gear 87 adjacent to the gear or wheel 168. The rollers 170 and 171 are spaced apart such distance that they will regularly shift or move the conveyers or link belts 131 at intervals by engagement with the slots 169 of the wheel 168 and simultaneously actuate the shaft 162 and wheels or gears 161, the spur gears rotating in the direction of the arrows shown by Fig. 1 and the Geneva wheels or gears rotating in the direction of the arrows shown by Figs. 1 and 3. The roller 170 first engages the Geneva wheel or gear 168 and operates to bring a carrier or box 139 into registration with the lower end of the hopper 147 and another carrier or box 139 into registration with the die box 50 so that as one carrier or box is being charged with plastic material or clay another carrier or box of the group is having the plastic material or clay discharged therefrom into the die box and die by the lower plungers 45. The carriers or boxes 139 remain inactive or at rest after the roller 170 is disengaged from the Geneva wheel or gear 168 and until the roller 171 engages the said Geneva wheel or gear, when the conveyers or link belts 131 and the carriers or boxes as well as the pallets between the latter will be again shifted to bring a pallet directly under the die box to receive the completed ware which is forced downwardly onto the pallet under the die box by the plungers 28 of the upper cross-head 27 as hereinbefore specified. It will be understood that before each pallet moves under the die box 50 to receive the completed ware the plungers 45 will have fully depressed or moved out of the way and each pallet remains under the die box or the conveyers or link belts 131 are inactive until the roller 170 again reaches and engages the Geneva wheel or gear 168. It will be understood that the operation of the shaft 162 and the conveyers or link belts 131 through the medium of the Geneva wheels or gears 168 and 161 is in timed relation to the operation of the plungers 45 and 28 and that ample intervals ensue between the time of pressing the plastic material or clay upwardly into the die from the several carriers or boxes 139 and the discharge of the completely pressed ware or product by the operation of the plungers 28.

In suitable bearings on the upper front portion of the uprights 8 a drive shaft 172 is mounted and has a pulley 173 on one end thereof which may be belted up to any suitable source of power. On the shaft 172 adjacent to the pulley 173 is a pinion 174 held in continual mesh with a gear 175 immediately below and mounted on a motion transmitting shaft 176 also mounted in suitable bearings on the uprights 8. On each end of the shaft 176 a pinion 177 is keyed or otherwise secured to rotate with the shaft, the pinions 177 continually meshing with the spur gears 87. By means of the gearing just explained the spur gears 87 are rotated at the proper rate of speed to effectively operate all of the mechanisms hereinbefore explained and which are controlled by the two spur gears and the cams and rollers carried by opposite sides thereof.

The parts of the conveyer frame 127 will be braced and the ways will be held in proper spaced relation by cross-bars 178 arranged at intervals along the length of the said frame as shown, the upper cross-bars serving to support the sheet metal bottom or closure 145. To maintain the rear extremity of the conveyer frame 127 in true position relatively to the plungers 28 and 45 or to compensate for wear and adjustment of the remaining parts of the mechanism as hereinbefore explained, bolt rods 179 are connected to the upper and lower ways 128 of the conveyer frame and to adjacent rear members of the uprights 8. These bolt rods operate as stays and have their outer ends screw-threaded, as at 180, said screw-threaded ends extending through bored bosses 181 formed as a part of the rear members of the uprights 8 and engaged by inner and outer nuts 182 and 183 whereby these rods may be adjusted by loosening the nuts and after making the adjustment again tightening said nuts. The intermediate portions of the bolt rods 179 are flattened, as at 184, for convenience in securing the same to the ways 128 of the conveyer frame 127 by means of suitable bolts or other fastenings.

After the ware has been deposited upon the successive pallets the latter are regularly taken off in rear of the pressing and shaping mechanism over the rear curved sections 129 of the conveyer frame 127. When comparatively thin ware, such as bricks, is formed the means for taking off the pallets bearing the pressed ware or bricks thereon consists of a pair of suitably driven carrier belts or analogous devices 185 which engage roller means, as at 186, mounted at a distance inwardly from the rear maximum projection of the conveyer frame 127 or the rear curved section 129, said carrier belts being spaced apart such distance as to permit the carriers or boxes 139 to pass therebetween and fully clear the same, as shown by Fig. 2. As the supporting link arms 134 approach the roller means 186 they move close enough to the latter to deliver the successive pallets onto the carrier belts 185, said supporting link arms effecting this deliverance prior to the time that they begin to lower in rounding the rear end section 129 of the conveyer frame 127. It will be understood that there will be ample room for the ends of the supporting link arms 134 to clear the roller means 186, and pass regularly around the end section 129 at the rear of the machine, and, moreover, the carrier belts 185 will move with sufficient speed to quickly take off the pallets from the supporting link arms 134, or the several pallets will be projected far enough over onto the carrier belts 185 prior to the full depression of the supporting link arms 134 to give stable support to the successive pallets bearing the ware and without liability of displacement of the pallets and the ware thereon, the link supporting arms owing to the progressive movement thereof pushing the pallets over onto the carrier belts 185. The clearance for the carriers or boxes 139 between the carrier belts 185, or the disposition of the said carrier belts in such manner that the carriers or boxes 139 may pass therebetween is necessary in view of the vertical extent of the said carriers or boxes which are used in making comparatively thick ware or bricks, and in cases where rather shallow ware is formed the carriers or boxes 139 will be materially reduced in depth and as a consequence the means for taking off the pallets 144 bearing the pressed ware may consist of a single or wide belt 187, as shown by Fig. 14, and the roller 188 engaged by this belt will be so disposed that the carriers or boxes 139 will clear the roller and the adjacent portion of the belt 187, and the free ends of the supporting link arms are beveled, as at 189, to also adapt them to move close to the roller 188 and the belt 187 thereover and clear the latter parts when the said link arms 134 depress. As shown by Fig. 14, the link arms 134 are just moving downwardly and clearing the pallet 144 which has been moved over onto the belt 187, and the pallet continues to engage the link arms 134 at their inner or rear portions for a considerable time or until the pallet is moved over far enough onto the belt 187 to be supported with stability. This latter operation will ensue in connection with the two carrier belts, shown for instance by Fig. 2, the pallets during their discharge in all cases being supported for a considerable length of time at their rear extremities on the link arms 134 and progressed or moved over to the discharging means by the said link arms until a reliable engagement of the pallets 144 with the conveyer belts or the single belt as shown by Fig. 14 has ensued. The pallets bearing the pressed ware taken off by either of the discharge means as just explained are conveyed to a suitable point and relieved of the ware which may be then subjected to the usual drying and burning operations.

A very important advantage of the present construction and arrangement of parts resides in the operation of the conveyers 131 for the carriers or boxes 139 relatively to the die box 50, the carriers or boxes 139 moving very close to the lower open side of the said die box, and after the ware has been formed in the die box and is pushed downwardly through the latter by the upper pressure devices or plungers 28 there will of necessity be a slight expansion of the ware, and under regularly operating conditions the said ware will not move back or upwardly into the die box 50. Should the ware, however, be pulled back or follow upwardly with the upper set of plungers or pressure devices and partially, at least, enter the die box by means of adherence to the upper pressure devices or plungers, said ware thus adhering to the die box will be scraped off by the carriers or boxes 139 and therefore it will be impossible to have double charges of clay introduced into the die box. In machines of this type now commonly used the ware frequently sticks to the die box and when the latter is recharged a double charge of clay in the die box ensues. By the operation of the carriers or boxes 139 as just explained such double charging of the die box is prevented.

One of the most effective mechanical features of the improved machine is the operation of the toggle levers 107, these levers exerting their greatest pressure in an upward direction when they are perpendicularly straight, but at no time do these levers exert an outward pressure toward the opposite sides of the machine or against the pairs of uprights 8, and as a consequence there is less wear on the slides 42 and the frame structure of the machine as comprised between the uprights 8 and including the latter may be materially lighter and still have sufficient strength and durability. When the mechanisms hereinbefore explained operate to throw out or break the pairs of toggle levers 107, the parts are so constructed, and the cams 89 so shaped that the said toggle levers will quickly fall out and permit a rapid descent of the cross-head 40 and its plungers 45 flush with the plate 145 through which the said plungers move. It will be understood in referring to the plungers 28 and 45 in the foregoing description that the plungers as a whole are meant or the said plungers with the pressure or face plates that may be secured thereto.

The improved machine also embodies lubricating attachments for feeding a lubricant or oil to the die box and the lower set of plungers at regular intervals for the purpose of preventing the pressed ware from sticking in the die box and to prevent the plastic material or clay from adhering to the face plates of the plungers and also to facilitate the discharge of the pressed and shaped ware from the die box to the pallets 144 that regularly move in position beneath the die box alternately with relation to the carriers or boxes 139. This lubricating attachment coöperates with the die box to spray the lubricant or oil into the interior of the box and also between the bottom plate 145 and the sectional plates 144ª and 144ᵇ disposed on the conveyer links between the carriers or boxes 139 to also lubricate the lower set of plungers 45 and their face plates. The improved lubricating means comprises an upper oil feeding pipe 190 communicating with a suitable oil supply source and surrounding the die box 50, as clearly shown by Figs. 19 and 20, said oil feeding pipe having a plurality of needle valves 190ª with upwardly projecting hand wheels or turning heads 191. A number of the needle valves 190ª are located adjacent to opposite sides of the die box 50 and a single needle valve 190ª is disposed adjacent to each end of the said die box. Below the oil feeding pipe 190 is a compressed air pipe 192 which also surrounds the die box 50, and between the needle valves 190ª and unions 193 disposed thereunder in the pipe 192 are tubular connections 194 having reduced bores 195, as clearly shown by Fig. 22, the upper ends of the bores being conically shaped as at 196 to form seats for the lower tapered ends of the needle valves 190. Depending from the unions 193 are vertical conveying pipes 197 having lower angularly disposed nozzles 198 which are secured in lower bores 199 formed in the side walls of the die box 50 close to the bottom of the latter. The bores 199 extend horizontally through the side walls of the die box and each of the dies which will be used or insertible in the die box will be formed with upwardly inclined spray bores 200 which are slightly flared at their inner terminals, as at 201, there being the same number of spray bores 200 in each die as there are bores 199, and as the bores 199 are materially greater in diameter than the spray bores 200 the dies may be adjusted without interfering with the communication of the bores 200 with the bores 199. Each conveying pipe is supplied with a suitable cut-off or plug valve 202 having a valve member 203 therein, as shown by Fig. 19, provided with an outwardly projecting operating stem or bar 204 which is horizontally disposed, and all of the bars are movably attached at their outer ends to a shifting lever 205. The two shifting levers 205 are movably connected and are permitted to have sufficient play relatively to the opposite ends of a horizontally disposed rock-lever 206 fulcrumed against the under portion of one of the die box supporting arms 51. The rock-lever 206 at its center has an inwardly projecting downwardly deflected trip arm 207 which has its free extremity also deflected horizontally, as at 208, see dotted lines in Fig. 20, and located adjacent to the path of movement of one end of each of the carriers or boxes 139, the ends of the carriers or boxes 139 having thereon a trip projection or stud 209. The trip projections or studs 209 are so located on the ends of the carriers or boxes 139 or have such relative position to the lengths of the said carrier or box ends that they will engage the horizontally deflected extremity 208 of the trip lever 207 just prior to the disposition of each box or carrier in accurate registration with the under side of the die box 50 so that when the projection or stud 209 of each carrier or die box passes the end of the trip arm 207, said carrier or box will be in operative position under the die box. The rock lever 206 is returned to its normal position by the spring connected thereto and to an adjacent portion of the die box 50, as shown by Fig. 20. By means of the rock-lever 206 and the shifting levers 205 all of the valves 202 are simultaneously opened so that the oil may flow through the conveying pipes 197 into the nozzles 198 and from the latter into the bores 199 and be sprayed through the bores 200 into the interior of the die in the die box so as to fully lubricate the walls of the die openings to prevent adherence of the plastic material or clay and to provide for a ready removal of the pressed ware from the die and die box. The oil pipe 190 is connected to an oil tank 211, as shown by Fig. 19, a cut-off valve 212 being interposed in this pipe to shut off the supply of oil when desired. The pipe 192 is connected to a tank 213 for receiving air under pressure from a suitable source, said pipe 192 also having a cut-off valve 214 therein. Between the tank 213 and the top of the oil tank 211 is a connecting pipe 215 whereby the air under pressure may be supplied to the top of the oil tank and by this means the oil in the tank 211 and the pipe 190 which feeds the oil from the said tank has a pressure imposed thereon in all respects similar to the pressure in the pipe 192, and as a consequence the oil is caused to drip or pass through the tubular connections 194 under the same pressure as the air in the pipe 192 and this uniformity of pressure in the two pipes or on the oil and the air effects a more positive and reliable feed of the oil to the nozzles 198 when the valves 202 are opened. The quantity of oil passing down through the tubular connections 194 will, of course, depend upon the adjustment of the needle valves 190ª.

It is also necessary to lubricate the lower plungers 45 operated by the cross-head 40, and this lubrication is accomplished by means working independently of the lubricating devices just explained. The arms 34 of the cross-head 27, as clearly shown by full and dotted lines in Fig. 20, are provided with reversely projecting horizontally disposed contacts or strikers 216 and 217, and adjacent to the opposite ends of the die box 50 respectively in advance and in rear of the longitudinal center of said box are rods 218 and 219 which are respectively attached at their upper ends to trip levers 220 held by uprights or posts 221 secured to the ends of the die box 50, said trip levers having inner hinged ends 222 which are adapted to be engaged by the strikers 216 and 217. The lower ends of the rods 218 engage the outer ends of elongated valve operating levers 223 connected to the stems of valves 224 of conveying pipes 225 having lower nozzles 226 directed inwardly, one of the conveying pipes and its nozzle being located adjacent to each end of the die box 50 in the position shown by Fig. 20 so as to clear the rollers 137 of the endless conveyers and also to provide for thorough lubrication of the plungers 45 and the face plates or die plates carried thereby. The levers 223 are depressed against the resistance of springs 227 connected thereto and to an adjacent portion of the die box. The extremities of the rods 218 and 219 which engage the trip levers 220 and the valve operating levers 223 are screw-threaded and provided with adjusting nuts 228 whereby the stroke of the rods may be lengthened or shortened to vary the movement of the valves 224 to modify the supply of oil sprayed through the nozzles 226 as may be desired. It will be understood that the valves 224 will have suitable valve stems connected to the levers 223 and also that as soon as the trip levers 220 are liberated from pressure contact by the striker plates 216 and 217 the valves 224 will be closed and the rods 218 and 219 as well as the levers 220 and 223 will be returned to normal position. The nozzles 226, as shown by Fig. 24, are adapted to have their outlet ends register at intervals with openings 229 in the plates 144ª and which in turn register with passages 230 below said openings in the links 134, these openings 229 being shown by Fig. 11. The passages 230 form inlets to the chambers provided between the plates 144ª and 144ᵇ and the bottom plate 145, and as the plates 144ª and 144ᵇ come over the portion of the bottom plate 145 through which the plungers 45 have upward movement the cross-head 27 with its arms 34 descends to effect a discharge of the pressed ware in the die box 50 through the medium of the plungers 28 on the pallet which will then be located below the die box, and the descent of the arms 34 causes the striker plates or projections 216 and 217 to engage the inner hinged extremities or ends 222 of the levers 220, thereby depressing said ends and raising the outer ends of the said levers 220 and pulling upwardly on the rods 218 to open the valves 224 through the medium of the levers 223. The conveying pipes 225 connect with the lower air under pressure pipe 192 and with the oil pipe 190 through the medium of the tubular connections 194 and needle valves 190ª hereinbefore explained, and when the lower valves 224 are opened by the levers 223 the oil is sprayed or forced through the openings 229 and passages or inlet bores 230 between the plates 145 and 144ª and is deposited upon the face plates or die plates on the ends of the plungers 45 to thoroughly lubricate the latter while they are in depressed position so that the said plungers and their plates will be efficiently supplied with oil or other lubricant at each interval when the ware is being discharged from the die box onto a pallet thereunder. When the cross-head 27 with its arms rises to normal position the striker plates or projections 216 engage the inner hinged ends 222 of the levers 220 and said hinged ends move upwardly without in the least operating the rods 218 and 219.

From the foregoing it will be seen that the plungers 45 as well as the die within the die box 50 may be thoroughly lubricated in an automatic manner by oil under pressure which is commingled with air under pressure, this lubrication being effected at regular intervals and with material benefit in the treatment of the plastic material, both during the pressing operation and discharge of the ware compression without liability of adherence of the clay either to the die walls or to the plungers. The lubricant which is admitted to the die box will be engaged by the clay and in part carried by the latter so that the upper plungers or the plates of the latter will not in the least adhere to the plastic material or clay, and therefore it will be unnecessary to provide special lubricating means for the upper plungers 28 in view of the ample lubrication of the die box which also affects these upper plungers during their operation on the plastic material or clay.

The operation of the several mechanisms will be readily understood from the foregoing description, and among other advantages of the improvement is the superior grade of the resultant product which is due largely to the positive pressure exerted on the plastic material within the die box or die by the opposed pressure devices which contribute to the die action or serve as parts of the die organization when in the die box. The resultant product is also without lamination and less porous than articles ordinarily produced from plastic material by pressure devices of the character heretofore commonly employed. Another of the important advantages of the present machine is that either of the dies may be set or adjusted in the die box 50 at various elevations and the plungers 28 and 45, together with their cross-heads, may be correspondingly adjusted to vary the thickness of the ware produced by the use of a single die. For instance, the upper cross-head 27 involving the arms 34 and 37 may be adjusted relatively to the upper ends of the bars 92 so that the said cross-head and its arms with the plungers 28 may fall or drop normally to a lower point than the normal position thereof and be maintained in such position so as to shorten the stroke thereof relatively to the stroke of the lower cross-head 40 with its plungers 45 and effect a quicker pressing coöperation between the two sets of plungers without in the least modifying the cams or the means for actuating the upper cross-head 27 and plungers 28. Moreover, the lower cross-head 40 with its plungers 45 may be readily adjusted to vary its length of stroke without in the least modifying the cams 89 coöperating with the levers 112 as hereinbefore explained, and by this adjustment of the cross-heads and plungers the scope of the machine as to production of ware of various thicknesses is materially extended or the machine is capable of producing ware of various thicknesses having the same general contour to adapt the same for any kind of work or application without displacing the prime operating mechanisms or disturbing the essential organization of the main die and the opposed pressure means coöperating therewith. As in all machines of this type also it is intended to introduce die boxes that may vary in depth, such change being an obvious one in modification of proportions, and, furthermore, it is also customary in machines of this character in regulating the feed or supply of the plastic material to replace the feed controlling cams by other similar devices having a contour slightly differing from those having a certain timed operation and whereby a difference in the time of operation may result and the amount of clay supplied to the clay boxes may thus be modified without materially disturbing the essential features of the organization. These several adjustments and obvious changes in the proportions or dimensions of the parts will compensate for the various thicknesses in ware as well as the amount of clay supplied to the die boxes.

A further modification of the mechanism is shown by Fig. 25 and relates to the projections 170 and 171 on the one spur gear 87. In assembling the parts of the mechanism and particularly the Geneva wheel 168 relatively to the projections 170 and 171, difficulty may be encountered in obtaining an accurate timed registration and operation of the said wheel 168 and the conveyers 131 when the projections 170 and 171 are fixed. Consequently, as shown by Fig. 25, a plate 171$^a$ is provided carrying each projection, only one of the projections, namely, projection 171 being shown so constructed. The remaining projection 170 will be similarly mounted on the gear 87. The plate 171$^a$ has longitudinal slots 171$^b$ and 171$^c$ which are engaged by screws or adjusting bolts 171$^d$ and 171$^e$ fitted in suitable openings in the gear 87. The gear 87 has suitable openings to receive the screws or bolts 171$^d$ and 171$^e$ and is also provided with a radial slot 87$^a$ which is adapted to be engaged by the screw or bolt 171$^e$ to permit the plate 171$^a$ to be moved or shifted inwardly or outwardly in a radial direction at one extremity and thereby correspondingly shift the projection 171. The plate 171$^a$ may also be adjusted longitudinally, and by means of these adjustments the projection 171 may be positioned as desired to register with the slots of the said Geneva wheel or gear and give the proper timed movement of the conveyers 131.

What is claimed is:

1. In a machine for pressing and shaping plastic material, pressing devices having relative movements toward and from each other, die means in which said pressing devices operate, and alternating means for automatically and successively feeding charges of plastic material under the die means and between the pressing devices and for receiving the pressed ware from the die means by the operation of part of the pressing devices.

2. In a machine for pressing and shaping plastic material, superposed pressing devices having relative movements toward and from each other, die means into and from which the pressing devices have movement, carriers for automatically conveying successive charges of plastic material to the die means between the pressing devices, and removable means between the said carriers for receiving the pressed ware from the die means.

3. In a machine for pressing and shaping plastic material, devices having relative pressing coöperation, die means with which the said devices coact, a plurality of carriers for plastic material having connected means for successive movement to and from the pressing devices and die means, pallets removably held by parts of said connecting means between and moving similarly to the carriers for receiving the pressed and shaped ware from the die means, and means for taking the pallets bearing the ware away from the rear of the machine.

4. In a machine for pressing and shaping plastic material, devices having relative pressing coöperation, die means with which the said devices coact, a plurality of carriers connected for successive movement to and from the said devices and die means, charging means for successively supplying the carriers with plastic material, slide means for cutting off the supply of plastic material at intervals and for clearing the surplus plastic material from and leveling said material at the top portions of the carriers, and means for receiving the pressed and shaped ware from the die means.

5. In a machine for pressing and shaping plastic material, devices having relative pressing coöperation, die means with which the said devices coact, a plurality of carriers having connecting means for successive movement to and from the said devices and die means, charging means for successively supplying the carriers with plastic material, slide means for cutting off the supply of plastic material at intervals and for clearing the surplus plastic material from and leveling said material at the top portions of the carriers, pallets removably mounted on parts of said connecting means between the carriers to receive the pressed and shaped ware from the die means, and means for discharging pallets from the rear extremity of the machine.

6. In a machine for pressing and shaping plastic material, opposed pressing devices having relative movements toward and from each other, die means always remaining in the same operative position between and with which said devices operate, and a plurality of connected intermediately jointed carriers for plastic material, said carriers being longitudinally movable toward and beneath the die means and between the pressing devices, the pressing devices being movable in part through the carriers and also in part operating to expel the pressed ware from the die means.

7. In a machine for pressing and shaping plastic material, pressing devices having relative movements toward and from each other, die means with which the said pressing devices operate, longitudinally movable conveyers progressively operating between the pressing devices and below the die means and having a plurality of carriers for plastic material, each carrier being intermediately jointed and open at the top and bottom and successively movable beneath the die means for placing the charges at the bottom of said die means, and means for charging the carriers before they reach the pressing devices and die means, a portion of the pressing devices being movable through the carriers to dispose the charges in the die means, the remaining portion of the pressing devices being operative to expel the pressed ware from the die means.

8. In a machine for pressing and shaping plastic material, pressing devices having relative movements toward and from each other, die means with which said devices operate, endless conveyers having carriers or boxes for plastic material, the said carriers or boxes being movable under the die means and engaged by a portion of the pressing devices, pallets removably mounted on the conveyers between the carriers, the conveyers having members for holding the pallets in discharging position, and means for receiving the pallets and removing them from the said members.

9. In a machine for pressing and shaping plastic material, pressing devices having relative movements toward and from each other, die means between and with which said pressing devices coöperate, a plurality of connected and successively moving carriers for plastic material open at top and bottom, a fixed bottom means over which all the carriers move, charging means for supplying plastic material to the successive carriers, pallets to receive the pressed and shaped ware from the die means, the pallets having devices coöperating therewith for holding them in discharging position at the end of the machine, and means for receiving the pallets carrying the ware from the end of the machine.

10. In a machine for pressing and shaping plastic material, pressing devices having relative movements toward and from each other, die means in which said pressing devices operate, endless conveyers having a plurality of links, a portion of the latter serving as supporting arms, carriers for plastic material secured to the conveyers, the said supporting arms being between the said carriers, means for charging the carriers with plastic material, and pallets removably mounted between the carriers on the supporting links, the supporting links holding the pallets at the end of the machine in discharging position.

11. In a machine for pressing and shaping plastic material, pressing devices having relative movements toward and from each other, die means between the pressing devices and in which the latter operate, endless conveyers having carriers for plastic material connected thereto and movable longitudinally under and from the die means between the pressing devices, the carriers being open at top and bottom, a fixed bottom plate common to all of the carriers and over which said carriers have movement, a charging means having an outlet under which the carriers also move, a cut-off slide at the outlet of the charging means for checking the supply of the plastic material relatively to the carriers at intervals and also for clearing and leveling the plastic material at the top of the carriers, and pallets removably mounted between the carriers to receive the pressed and shaped ware from the die means.

12. In a machine for pressing and shaping plastic material, vertically opposed pressing devices having approaching and receding movements relatively to each other at timed intervals, die means between and in which said pressing devices operate and have reverse movement, fixed resisting stops co-acting with the upper portion of the pressing devices while the remaining lower portion of said pressing devices is exerting a maximum upward pressure movement in the die means, means movable between the pressing devices progressively in one direction and having carriers open at the top and bottom for automatically and successively feeding charges of plastic material to the die means, a part of the pressing devices being movable into and through the carriers for pressing the charges in the die means and discharging the ware therefrom onto a part of the said charge feeding means.

13. In a machine for pressing and shaping plastic material, opposed pressing devices having relative movements toward and from each other, pressure resisting means engaged by a portion of the pressing devices while the remaining portion of the said devices is exerting a maximum pressure in a straight line in the die means, conveying means embodying carriers for automatically and successively feeding charges of plastic material to the die means and between the pressing devices and through which a portion of the pressing devices is movable, carriers having connecting means connected thereto, and pallets held on said conveying means between the carriers for receiving the pressed and shaped ware from the die means through the operation of a part of the pressing devices.

14. In a machine for pressing and shaping plastic material, opposed pressing devices having relative approaching and receding movements, die means between the pressing devices and in which the latter operate, conveying means for automatically and successively feeding charges of plastic material to the die means and between the pressing devices and embodying a plurality of connected carriers which are disposed under the die means and between the said pressing devices, and mechanism for operating the pressing devices to cause the latter to first move toward each other and then a portion thereof to move away from the remaining portion relatively to the die means and finally to cause a portion of the pressing devices to move through the die means and discharge the pressed and shaped ware therefrom, the conveying means being also adapted to receive the pressed and shaped ware from the die means.

15. In a machine for pressing and shaping plastic material, opposed pressing devices having relative approaching and receding movements, die means between the pressing devices and in which the latter operate, an endless conveyer having spaced carriers for supplying charges of plastic material to the die means and progressively movable between the pressing devices, mechanism for operating the pressing devices to cause the latter to first approach to press and shape the plastic material and then a portion thereof to recede from the remaining portion, and finally to cause a portion of the pressing devices to move through the die means and discharge the pressed and shaped ware therefrom.

16. In a machine for pressing and shaping plastic material, opposed pressing devices having relative approaching and receding movements, die means between the pressing devices and in which the latter operate, a continuous conveyer comprising a plurality of carriers for supplying charges of plastic material to the die means, the conveyer with its carriers being disposed to pass between the pressing devices and having mechanism for imparting an interval movement to the carriers and cause the latter to regularly aline with the lower portion of the die means, and mechanism for operating the pressing devices to cause the latter to first approach and in part pass through an adjacent carrier to dispose a charge of plastic material in the die and press and shape said material and then effect a recession of a portion of said pressing devices from the remaining portion thereof, and finally to cause a portion of the pressing devices to move through the die means and discharge the pressed and shaped ware therefrom, and means for receiving the discharged ware.

17. In a machine for pressing and shaping plastic material, die means having an adjustable die, pressing devices disposed on opposite sides of the die means and die and having approaching and receding movements relatively to the die means and adjustable to vary the position thereof and thickness of the ware produced, and an endless conveyer movable in one direction only between the pressing devices having charging members for supplying the die means with unmolded plastic material, a part of the pressing devices being movable into and through said charging members.

18. In a machine for pressing and shaping plastic material, die means having an adjustably mounted die, pressing devices disposed on opposite sides of the die means and having approaching and receding movements relatively to the die means and die, means progressively movable below the die means and between the pressing devices for charging the said die means with plastic material, a part of the pressing devices being movable into and through members of the said charging means, and means for automatically supplying the charging means with unmolded plastic material and relieving the charging means of excess material.

19. In a machine for pressing and shaping plastic material, die means having an adjustably mounted die therein, pressing devices having approaching and receding movements relatively to the die means and die and independently adjustable to vary the position thereof and the thickness of the ware produced by the die within the die means, the adjustment of the pressing devices and of the die being independent, an endless conveyer comprising a plurality of carriers for charging the die and die means with unmolded plastic material, a part of the pressing devices being movable through the carriers, and prime operating mechanism for the pressing devices having parts thereof adjustable without modifying the normal operation of said mechanism.

20. In a machine for pressing and shaping plastic material, an adjustable die box having a die adjustably mounted therein, pressure devices having approaching and receding movements relatively to the die box and die, the upper portion of said pressure devices being adjustable, mechanism for operating the pressure devices and also embodying adjustable feeders to modify the action of the pressure devices, traveling carriers movable in one direction between the pressure devices and beneath the die box and die to supply the latter with plastic material in predetermined charges, said traveling carriers being provided with means for regulating their time of movement relatively to the pressure devices, die box and die, and means for regularly and automatically charging the individual carriers with unmolded plastic material prior to reaching the said pressure devices, die box and die.

21. In a machine for pressing and shaping plastic material, a die box having a die adjustable therein, vertically disposed pressure devices having approaching and receding movements relatively to opposite portions of the die box and die and both movable into and partially through the said die box and die, the pressure devices being adjustable and the lower portion of the pressure device provided with pairs of jointed toggle levers having adjustable actuating devices for quickening the stroke thereof, prime operating mechanism for the pressure devices constantly remaining in a normal operating condition irrespective of the adjustment of the pressure devices and the variation of stroke of the latter, and connected traveling carriers for charging the die box and die with unmolded plastic material and progressively movable between a part of the pressure devices and the die box and having means coöperating therewith for controlling the time of movement thereof relatively to the said devices and die box.

22. In a machine for pressing and shaping plastic material, die means embodying an adjustable die, pressure devices coöperating with opposite portions of the die means and provided with adjusting means, a portion of the pressure devices having levers with intermediate break joints to exert a pressure in a straight line thereon, leverage controlling mechanism having adjustable slotted segments engaging the joints of the said levers, mechanism for actuating the said leverage controlling mechanism and for operating the lever devices, and carriers progressively movable between the pressure devices and a part of the latter and the die means and die for charging the said means with plastic material, the said carriers having means coöperating therewith for regulating the time of movement thereof relatively to the die means and pressure devices.

23. In a machine for pressing and shaping plastic material, die means, pressure devices coöperating with the die means, linked conveyers having a plurality of carriers secured thereto at opposite ends, the carriers being jointed so as to break in the center, a conveyer frame having curved end sections over which the conveyers and the carriers have movement, and means for charging the carriers with plastic material, the carriers being movable into registration with the die means and having the plastic material removed therefrom by a portion of the pressure devices.

24. In a machine for pressing and shaping plastic material, die means, a conveyer frame, conveyers mounted in the frame and comprising a plurality of jointed links, the frame having curved end sections over which the conveyers have movement, a plurality of carriers with fully open opposite portions and connected at their ends to links of the conveyers and movable by the latter into registration with the die means, the carriers being jointed lengthwise at the center to break with the links to which they are attached when rounding the end sections of the conveyer frame, a plate forming a bottom common to all of the carriers and over which the latter have movement, the plate being fixed to a portion of the frame, and means for charging the carriers with plastic material, a portion of the pressure devices being movable through said plate and the carriers to dispose the charges of the latter in the die means.

25. In a machine for pressing and shaping plastic material, die means, pressure devices coöperating with the die means, linked conveyers having a plurality of carriers secured at their opposite ends to pairs of links, the carriers being longitudinally jointed at the center and formed with beveled joints, a conveyer frame having curved end sections over which the conveyers and the carriers have movement, and means for charging the carriers with plastic material, the carriers being movable into registration with the die means and their charges disposed in said means.

26. In a machine for pressing and shaping plastic material, die means, pressure devices coöperating with the die means, toggle levers movably connected to opposite portions of a part of the pressure devices, controlling segments movably associated with the toggle levers to automatically collapse the latter at intervals, levers to which the said segments are connected, and mechanism for operating the said levers to which the controlling segments are connected and for actuating the pressure devices as a whole in timed relation.

27. In a machine for pressing and shaping plastic material, die means, pressure devices coöperating with the die means, mechanism including duplicate cams at opposite sides of the machine for operating the pressure devices, pairs of toggle levers connected to opposite portions of a part of the pressure devices on opposite sides of the center of the machine, means for breaking the joints of the toggle levers, and levers to which the said joint breaking means are connected, the latter levers extending in opposite directions and engaging the cams at opposite sides of the machine.

28. In a machine for pressing and shaping plastic material, die means, pressure devices coöperating with the die means, similar cams at opposite sides of the machine for operating the pressure devices, toggle levers connected to a part of the pressure devices, and mechanism for breaking the joints of the toggle levers and including oppositely extending levers engaging portions of the said cams and having a loose fulcrum connection at their inner ends.

29. In a machine for pressing and shaping plastic material, die means, pressure devices coöperating with the die means, a part of the pressure devices having opposite pairs of toggle levers connected thereto on opposite sides of the center of the machine, similar cam devices at opposite sides of the machine for operating the pressure devices, and levers extending outwardly in opposite directions from the center of the machine and engaging portions of the cams at their outer ends, the said latter levers having adjustable means for movably engaging the intermediate fulcrums of the toggle levers to break the joints of said toggle levers and permit the part of the pressure devices operated by the toggle levers to recede from the remaining pressure devices.

30. In a machine for pressing and shaping plastic material, the combination of a frame embodying uprights, die means supported by the uprights and normally held in fixed position, pressure devices coöperating with opposite portions of the die means and each comprising a cross-head, pairs of toggle levers movably connected to one cross-head on opposite sides of the center of the latter and having intermediate connecting fulcrum means for each pair, similar cams disposed at opposite sides of the machine, oppositely extending levers engaging the cams and provided with controlling segments movably associated with the intermediate fulcrum means of the pairs of toggle levers, and means connected to the remaining cross-head and engaging the cams for reciprocating the latter cross-head in timed relation to the movements of the other cross-head.

31. In a machine for pressing and shaping plastic material, a frame, similar cams at opposite sides of the frame, a die means supported by the frame and normally held in fixed position, pressure devices coöperating with opposite portions of the die means and each embodying a cross-head reciprocatingly mounted in the frame, pairs of toggle levers movably connected to each extremity of the one cross-head on opposite sides of the center of the latter and having intermediate connecting fulcrum means, levers extending outwardly from the center of the machine toward opposite sides and engaging portions of the cams, the latter levers having controlling segments engaging the intermediate fulcrums of the pairs of toggle levers, the segments being adjustable to change their positions relatively to the toggle levers to modify the time of movement of said toggle levers, and operating connections between the remaining cross-head and the cams.

32. In a machine for pressing and shaping plastic material, a frame, similar cams at opposite sides of the frame, die means supported by and held in normally fixed position within the frame, pressure devices coöperating with opposite portions of the die means and having independently operative cross-heads, and operative connections between the cross-heads and the cams, the operative connections between one cross-head and the cams having an adjustable attachment relatively to the said cross-head to vary the stroke of this cross-head and the pressure devices thereof relatively to the die and the remaining pressure devices.

33. In a machine for pressing and shaping plastic material, a frame, similar cams at opposite sides of the frame, die means supported and normally held fixed between parts of the frame, pressure devices coöperating with opposite sides of the die means, the pressure devices being in distinct groups and each having a cross-head, toggle levers connected to one cross-head, devices operated by the cams for expanding and contracting the toggle levers, and bars also engaging the cams and provided with forked and slotted ends adjustably associated with opposite parts of the other cross-heads to vary the length of stroke of the latter and the pressure devices thereof.

34. In a machine for pressing and shaping plastic material, a frame, similar segments at opposite sides of the frame with cam grooves on the obverse and reverse faces thereof, die means normally held in fixed position within the frame and having a die adjustably mounted therein, groups of pressure devices coöperating with opposite sides of the die means and movable into the latter, each group of pressure devices having a cross-head and outwardly projecting arms, pairs of toggle levers connected to the arms of one cross-head on opposite sides of the center of the machine and provided with intermediate joints, devices engaging the intermediate joints of the pairs of toggle levers and portions of the opposite cams for expanding and contracting the said toggle levers and including adjustable means for modifying the time of stroke of the cross-head to which said toggle levers are connected, bars also engaging portions of the cams and adjustably connected to the arms of the remaining cross-head, and mechanism for uniformly operating the said cams.

35. In a machine for pressing and shaping plastic material, a frame, a shaft extending through the frame, cams fixed on opposite extremities of the shaft at opposite sides of the frame, the cams having obverse and reverse cam grooves of similar contour, mechanism for uniformly rotating the said cams and shaft, die means within the frame normally held in fixed position, distinct pressure devices coöperating with opposite portions of the die means and having cross-heads, the cross-head of a part of the pressure devices being provided with operative connections and actuated by the outer grooves of the cams, pairs of toggle levers connected to the remaining cross-head on opposite sides of the center of the machine and having intermediate fulcrum means connecting the said pairs, and similar devices associated with the fulcrum means of each pair of toggle levers and actuated by the inner grooves of the cams.

36. In a machine for pressing and shaping plastic material, a frame, cams mounted at opposite sides of the frame and having similar cam grooves, oscillating levers extending outwardly in opposite directions and engaging a part of the cam grooves at their outer ends and having controller segments provided with adjustable fulcrums held on the said levers, adjusting screw-rods connected to said segments and operative with the adjustment of the fulcrums to vary the angles of the segments relatively to the oscillating levers, die means normally held in fixed position within the frame, opposed pressure devices coöperating with the die means and each having a cross-head, the cross-head of the one pressure device being provided with operative connections engaging a part of the cam grooves of the cams, and pairs of toggle levers connected to opposite extremities of the remaining cross-head, each pair of toggle levers having an intermediate fulcrum slidable in one of the controller segments for effecting a uniform expansion and contraction of the pairs of toggle levers.

37. In a machine for pressing and shaping plastic material, a frame, cam devices at opposite sides of the frame connected for uniform movement, mechanism for operating the said cams, die means within the frame, pressure devices coöperating with opposite portions of the die means and actuated by the cams, the one cam having spaced projections, devices for charging the die with plastic material at intervals and including carriers, means for feeding the carriers with plastic material, a cut-off slide for the said feeding means operating to clear the carriers of surplus plastic material, a rock shaft having arms connected to the said slide, and an oscillating cam fixed on the rock shaft and engaged in alternation by the projections on the one cam at the side of the machine.

38. In a machine for pressing and shaping plastic material, die means, pressure devices coöperating with the die means, mechanism for operating the pressure devices, a part of the mechanism having cam actuating projections, means for supplying the die means with plastic material at intervals and including carriers, means for feeding the carriers with plastic material and having a cut-off slide which also operates to clear the plastic material from one side of the carriers, a rock shaft having means connected to the slide, and an oscillating cam fixed to the rock shaft and alternately engaged by the said projections at timed intervals to open and close the slide.

39. In a machine for pressing and shaping plastic material, a frame, comprising a base with uprights, a top member connecting the uprights, rods extending from the base through the uprights and top member, the uprights being adjustable on the rods between the base and top member, die means having supporting devices connected to the uprights, and pressure devices coöperating with the die means and having cross-heads movably held between the uprights, portions of the cross-heads and the supporting devices for the die means being reducible to compensate for the adjustment of the uprights.

40. In a machine for pressing and shaping plastic material, a frame having uprights with a top connecting member, a series of posts having portions thereof smooth and freely slidable vertically through but held against rotation in the center of the said top connecting member, the lower portions of the posts being screw-threaded and having pinions thereon through which the said posts are also movable, a shaft loosely extending through the top connecting member centrally between the said posts and having a gear on its lower end between and meshing with all the pinions of the posts and provided with an upper turning device whereby all the posts may be uniformly moved and adjusted, operatively fixed die means held between the posts and pressure devices coöperating with upper and lower portions of and movable into and in part through the die means, both the upper and lower portions of the pressure devices being independently adjustable, the adjustment of the upper portion of the die means modifying the movement thereof relatively to the die to vary the pressure on the plastic ware and having contacts for engagement with the lower ends of the screw posts to regularly distribute a resistance on different parts of the upper portion of the pressure devices.

41. In a machine for pressing and shaping plastic material, die means, pressure devices coöperating with the die means, mechanism coöperating with the pressure devices, and including opposite gears for operating the pressure devices, one of the gears having a radial slot intersected by a longer slot adjacent to and following a portion of the periphery thereof, conveyers having a progressive movement between the pressure devices and provided with means for supplying the die means with plastic material, mechanism for imparting a step-by-step movement to the conveyers and including a Geneva wheel, and a projection having a portion thereof to adjustably engage and move in the said gear slots, the said projection being adjustable inwardly and outwardly on the gear carrying the same and also forwardly and rearwardly relatively to the Geneva wheel whereby an accurate registration and proper timed operation of the projection relatively to the Geneva wheel may be obtained to precisely control the movements of the conveyers and the pressure devices to insure an accurate registration of the pressure devices with relation to the conveyers.

42. In a machine for pressing and shaping plastic material, upper and lower pressing devices, a die box between the pressing devices, means for supplying the die box with plastic material consisting of endless conveyers having carriers or clay boxes connected thereto at regular intervals and progressively movable closely under the die box and through the space between the one pressing device and the die box and close to the latter, whereby the carriers or clay boxes will remove any ware adhering to the die box and avoid double charging of said latter box, and mechanism for operating the pressing devices and conveyers alternately at timed intervals.

In testimony whereof I have hereunto set my hand in presence of two subscribing witnesses.

ABRAHAM B. KLAY.

Witnesses:
 CHAS. S. HYER,
 S. E. WHITE.

Copies of this patent may be obtained for five cents each, by addressing the "Commissioner of Patents, Washington, D. C."